(12) United States Patent
Hwang et al.

(10) Patent No.: US 11,375,334 B2
(45) Date of Patent: Jun. 28, 2022

(54) OPTIMIZING PICKUP LOCATIONS FOR TRANSPORTATION REQUESTS BASED ON A CONFIDENCE SCORE FOR A CONTEXT INFORMATION

(71) Applicant: Lyft, Inc., San Francisco, CA (US)

(72) Inventors: Thaddeus Insuk Hwang, San Francisco, CA (US); Charlie Lin, San Francisco, CA (US); Yuanyuan Malek, San Francisco, CA (US); Limin Shen, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/380,761

(22) Filed: Apr. 10, 2019

(65) Prior Publication Data

US 2019/0297450 A1 Sep. 26, 2019

Related U.S. Application Data

(63) Continuation of application No. 15/859,599, filed on Dec. 31, 2017, now Pat. No. 10,264,389.

(51) Int. Cl.
*H04W 4/00* (2018.01)
*H04W 4/02* (2018.01)
(Continued)

(52) U.S. Cl.
CPC .............. *H04W 4/02* (2013.01); *G06F 16/29* (2019.01); *G06Q 50/30* (2013.01)

(58) Field of Classification Search
CPC .......... H04W 4/02; G06F 16/29; G06Q 50/30
See application file for complete search history.

(56) References Cited

U.S. PATENT DOCUMENTS 8,126,903 B2  2/2012  Lehmann
8,504,295 B2  8/2013  Lerenc
(Continued)

FOREIGN PATENT DOCUMENTS

CN  202230521 U  5/2012
CN  103546515 A  1/2014
(Continued)

OTHER PUBLICATIONS

Office Action as received in Chinese Application 201580051256.8 dated Aug. 5, 2019.
(Continued)

*Primary Examiner* — Pakee Fang
(74) *Attorney, Agent, or Firm* — Keller Preece PLLC

(57) ABSTRACT

The present application discloses an improved transportation matching system, and corresponding methods and computer-readable media. According to disclosed embodiments, a transportation matching system receives a session indicator and device-based location. The system utilizes the received request and device-based location to identify and analyze historical transportation matching system information. The system then generates a confidence score based on this information that indicates a level of confidence that the device-based location is a pickup location associated with the request. If the generated confidence score exceeds a predetermined threshold, the system provides display components to a requestor computing device that enable confirmation of the transportation request with a single user interaction.

20 Claims, 12 Drawing Sheets

(51) Int. Cl.
G06Q 50/30 (2012.01)
G06F 16/29 (2019.01)

(56) References Cited

U.S. PATENT DOCUMENTS

| | | | |
|---|---|---|---|
| 9,157,748 | B2 | 10/2015 | Millspaugh |
| 9,230,292 | B2 | 1/2016 | Amin |
| 9,679,489 | B2 | 6/2017 | Lambert et al. |
| 9,978,282 | B2 | 5/2018 | Lambert et al. |
| 10,235,888 | B2 | 3/2019 | Lambert et al. |
| 10,264,389 | B1 | 4/2019 | Hwang et al. |
| 2001/0056363 | A1 | 12/2001 | Gantz et al. |
| 2002/0059296 | A1* | 5/2002 | Hayashi ............... G06F 16/29 |
| 2004/0088104 | A1 | 5/2004 | Izbicki et al. |
| 2004/0093280 | A1 | 5/2004 | Yamaguchi |
| 2006/0034201 | A1 | 2/2006 | Umeda et al. |
| 2008/0195428 | A1 | 8/2008 | O'Sullivan |
| 2009/0248587 | A1 | 10/2009 | Van Buskirk |
| 2010/0169199 | A1* | 7/2010 | Fuller ................. G06Q 10/08 705/34 |
| 2010/0321406 | A1* | 12/2010 | Iwase ................. G11B 27/105 345/638 |
| 2011/0099040 | A1 | 4/2011 | Felt et al. |
| 2011/0153191 | A1 | 6/2011 | Dhanani |
| 2011/0184770 | A1 | 7/2011 | Schwarzmann et al. |
| 2011/0225269 | A1 | 9/2011 | Yap et al. |
| 2011/0301985 | A1* | 12/2011 | Camp ............. G06Q 10/06311 705/5 |
| 2012/0041675 | A1 | 2/2012 | Juliver et al. |
| 2012/0173135 | A1 | 7/2012 | Gutman |
| 2012/0209516 | A1 | 8/2012 | Lee et al. |
| 2012/0232943 | A1 | 9/2012 | Myr |
| 2012/0262430 | A1 | 10/2012 | Ho et al. |
| 2013/0006517 | A1 | 1/2013 | Ofek et al. |
| 2013/0102333 | A1 | 4/2013 | Dam |
| 2013/0151141 | A1 | 6/2013 | Orikasa et al. |
| 2013/0158869 | A1 | 6/2013 | Lerenc |
| 2013/0159028 | A1 | 6/2013 | Lerenc et al. |
| 2013/0179205 | A1 | 7/2013 | Slinin |
| 2013/0184938 | A1 | 7/2013 | Dolinar et al. |
| 2013/0246301 | A1 | 9/2013 | Radhakrishnan et al. |
| 2014/0051465 | A1 | 2/2014 | Ruys et al. |
| 2014/0082069 | A1 | 3/2014 | Varoglu et al. |
| 2014/0129135 | A1 | 5/2014 | Holden et al. |
| 2014/0180764 | A1 | 6/2014 | Lehmann |
| 2014/0188775 | A1 | 7/2014 | Lehmann |
| 2015/0012341 | A1 | 1/2015 | Amin |
| 2015/0161554 | A1 | 6/2015 | Sweeney et al. |
| 2015/0161564 | A1 | 6/2015 | Sweeney et al. |
| 2015/0262430 | A1 | 9/2015 | Farrelly et al. |
| 2015/0324945 | A1 | 11/2015 | Lord et al. |
| 2016/0021154 | A1 | 1/2016 | Schoeffler |
| 2016/0224938 | A1 | 8/2016 | Shah et al. |
| 2017/0124491 | A1 | 5/2017 | Ding et al. |
| 2017/0339237 | A1* | 11/2017 | Memon ................. H04L 67/20 |
| 2018/0058863 | A1* | 3/2018 | Meyer ................. G01C 21/3415 |
| 2018/0089784 | A1* | 3/2018 | Yamashita ............ G06Q 50/30 |
| 2018/0268709 | A1 | 9/2018 | Lambert et al. |
| 2019/0063935 | A1* | 2/2019 | Badalamenti ...... G01C 21/3647 |

FOREIGN PATENT DOCUMENTS

| | | |
|---|---|---|
| EP | 1418557 A2 | 5/2004 |
| WO | WO 2019/133523 | 7/2019 |

OTHER PUBLICATIONS

Search Report as received in Chinese application 2015/80051256.8 dated Jul. 10, 2019.
Douglas O. Santos et al., "Dynamic Taxi and Ridesharing: A Framework and Heuristics for the Optimization Problem," Proceedings of the Twenty-Third International Joint Conference on Artificial Intelligence, Aug. 31, 2013 (Aug. 31, 2013), XP055490819, the whole document.
European Search Report as received in European application 15824609.0 dated Jul. 17, 2018.
Examination Report as received in European Application 15824609.0 dated Aug. 28, 2018.
Supplementary European Search Report as received in European Application 15824609.0 dated Nov. 13, 2018.
International Search Report & Written Opinion as received in PCT/US2018/067274 dated Apr. 30, 2019.
Jaeyoung Jung et al.: "Shared-Taxi Operations with Electric Vehicles, UCI-ITS-WP-13-1 Shared-Taxi Operations With Electric Vehicles", UCI-ITS-WP-13-1, May 31, 2012 (May 31, 2012), XP055490820, section 2.1; Fig.1.
Michael Colman. Uber Driver Training Video. Jun. 23, 2014 [retrieved on Aug. 1, 2015]. Retrieved from the Internet: <URL: https://www.youtube.com/watch?v=makYbqd7mG>A. entire document.
PCT International Search Report and Written Opinion dated Aug. 19, 2015 issued in application serial No. PCT/US2015/032687.
Office Action as received in Canadian application 2956063 dated Nov. 28, 2017.
Office Action as received in Canadian application 2956063 dated Oct. 18, 2018.
U.S. Appl. No. 14/723,134, filed Mar. 4, 2016, Office Action.
U.S. Appl. No. 14/723,134, filed Jul. 11, 2016, Office Action.
U.S. Appl. No. 14/723,134, filed Dec. 8, 2016, Office Action.
U.S. Appl. No. 14/723,134, filed Apr. 17, 2017, Notice of Allowance.
U.S. Appl. No. 15/588,281, filed Jun. 7, 2017, Office Action.
U.S. Appl. No. 15/588,281, filed Feb. 1, 2018, Office Action.
U.S. Appl. No. 15/588,281, filed Nov. 5, 2018, Notice of Allowance.
U.S. Appl. No. 15/603,240, filed Sep. 18, 2017, Office Action.
U.S. Appl. No. 15/603,240, filed Mar. 29, 2018, Notice of Allowance.
U.S. Appl. No. 15/859,599, filed Jul. 24, 2018, Office Action.
U.S. Appl. No. 15/859,599, filed Nov. 28, 2018, Notice of Allowance.
U.S. Appl. No. 15/985,469, filed Apr. 24, 2019, Office Action.
Office Action as received in Canadian application 2956063 dated Aug. 20, 2019.
Office Action as received in European Application 15824609.0 dated Aug. 21, 2019.
U.S. Appl. No. 15/985,469, Jun. 18, 2019, Notice of Allowance.
U.S. Appl. No. 16/653,687, Sep. 30, 2020, Office Action.
Office Action as received in Chinese Application 201580051256.8 dated Mar. 3, 2020.
Office Action as received in European Application 15824609.0 dated Mar. 10, 2020.
Office Action as received in Canadian application 2956063 dated Aug. 3, 2020.
Office Action as received in Chinese Application 201580051256.8 dated Jun. 22, 2020.
U.S. Appl. No. 16/653,687, Jan. 11, 2021, Notice of Allowance.

\* cited by examiner

OPTIMIZING PICKUP LOCATIONS FOR TRANSPORTATION REQUESTS BASED ON A CONFIDENCE SCORE FOR A CONTEXT INFORMATION

CROSS REFERENCE TO RELATED APPLICATIONS

This application is a continuation of U.S. patent application Ser. No. 15/859,599, filed Dec. 31, 2017. The aforementioned application is hereby incorporated by reference in its entirety.

BACKGROUND

The popularity and utilization of mobile app-based transportation matching systems has grown significantly in recent years. Through a transportation matching system, a requestor utilizes a requestor computing device to generate and send a transportation request including a pickup location and destination location (e.g., GPS coordinates). The transportation matching system then matches the transportation request to a transportation provider computing device associated with a transportation provider. Based on matching the transportation computing device with the transportation request, the transportation matching system provides an electronic communication to the provider computing device that includes the pickup location and destination location. The provider can then transport the requestor from the pickup location to the destination location following digital instructions the provider computing device presents to the provider (e.g., computer-generated route directions presented on a display device). Given their growing popularity, a transportation matching system can receive hundreds if not thousands of transportation requests for a single geographic area, while managing a network of hundreds of thousands of provider computing devices as well as millions of requestor computing devices.

It is common for a transportation matching system to require a user to manually input both a pickup location and a destination location associated with a transportation request. This, however, leads to many technical inaccuracies and inefficiencies. For example, a user may not be familiar with a geographic area to accurately input a pickup location address. Furthermore, due to various factors, a GPS location provided by the user's mobile device may not be accurate. Accordingly, the transportation matching system often wastes system resources in correcting manually specified pickup locations listed in transportation requests and compensating for inaccurate GPS locations. This leads to delayed transportation request processing times, failed transportation requests, and inefficient system and device management.

Accordingly, a need exists for a transportation matching system capable of more effectively and efficiently determining pickup locations associated with transportation requests.

BRIEF DESCRIPTION OF THE DRAWINGS

The detailed description refers to the drawings briefly described below.

DETAILED DESCRIPTION

Figure 1:
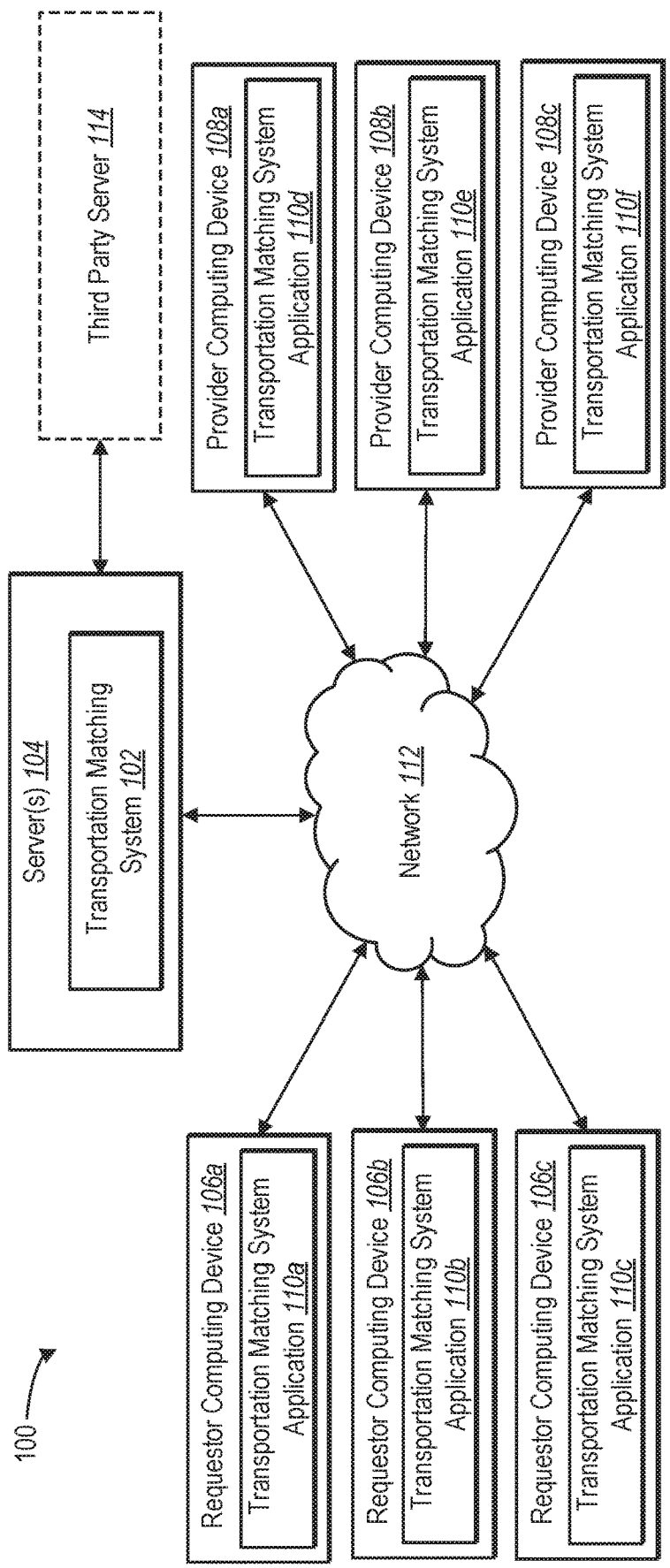
FIG. 1 illustrates an environmental diagram of the transportation matching system in accordance with one or more embodiments.

This application discloses various embodiments of a transportation matching system, computer readable media, and corresponding methods that provide benefits and/or solve the foregoing problems in the art. In accordance with one or more embodiments, a transportation matching system generates a confidence score that indicates a level of confidence related to a pickup location associated with a transportation request from a requestor computing device. If the confidence score is above a threshold amount, the transportation matching system enables display components of one or more graphical user interfaces provided via the requestor computing device that allow a requestor to quickly and easily accept or select a specific pickup location via the requestor computing device. In this manner, the transportation matching system reduces or eliminates the need for manual input of a pickup location. Furthermore, the transportation matching system significantly reduces or eliminates the waste of computer, network, and provider resources incurred by incorrect or inaccurate pickup locations in transportation requests associated with requestor computing devices.

For example, in at least one embodiment, the transportation matching system receives a session indicator (e.g., an electronic communication including partial transportation request information that does not fully define a pickup location) and a device-based location from a requestor device. In one or more embodiments, the transportation matching system identifies context information corresponding to the session indicator (e.g., user identification, historical ride data), and utilizes the identified information and/or the received device-based location to generate a confidence score of a potential pickup location. For instance, the confidence score represents a level of confidence of a potential pickup location that the transportation matching system should associate with the session indicator. For example, the transportation matching system can determine the generated confidence score exceeds a confidence score threshold.

In some embodiments, upon determining the confidence score exceeds a threshold, the transportation matching system provides an electronic communication to the requestor device that causes the requestor device to provide a visual suggestion of the potential pickup location within a graphical user interface, and the requestor can accept the suggestion by interacting with the graphical user interface. In other embodiments, the transportation matching system can determine to confirm the potential pickup location as the pickup location, thereby completing and executing the transportation request. Thus, the transportation matching system optimizes pickup locations associated with pickup requests, which in turn eliminates the computer resource inefficiencies and transportation network lag that result from an inaccurate pickup location associated with a transportation request.

To further illustrate the features and functionality of the transportation matching system, in at least one embodiment, the transportation matching system receives at least a session indicator from a requestor computing device. For example, a transportation request generally includes a pickup location, a destination location, and a user account identifier associated with the requestor computing device. To optimize the process by which a pickup location is defined and to increase the accuracy of a pickup location, the transportation matching system receives a session indicator, or in other words, an incomplete transportation request that includes some request data (e.g., a destination location, user account identifier), but does not include a pickup location.

In addition to receiving the session indicator, or as part of the information included in the session indicator, the transportation matching system can also receive a device-based location associated with the requestor computing device. For example, in at least one embodiment, the device-based location can include GPS location information associated with the requestor computing device. Additionally or alternatively, the device-based location can also include a location selected via one or more transportation matching system graphical user interfaces. For instance, in at least one embodiment, the transportation matching system application on the requestor computing device can enable a requestor to drag-and-drop a pin on an interactive map display to indicate the device-based location.

In one or more embodiments, in response to receiving the session indicator and the device-based location, the transportation matching system analyzes various factors within context information to determine one or more potential pickup locations. For example, the context information can include a predicted accuracy of the device-based location data (e.g., GPS data). To generate a predicted accuracy of the device-based location, the transportation matching system can analyze the number of GPS signals, the strength of GPS signals, or other attributes of the device-based location data.

In addition to determining an accuracy of the device-based location, the transportation matching system identifies other context information, such as historical information associated with the session indicator. For example, in at least one embodiment, the transportation matching system utilizes a user identifier included in the session indicator to identify a user-specific request history associated with the requestor (e.g., pickup location history). Additionally, the transportation matching system utilizes the device-based location to identify a location-specific request history associated with the device-based location. For instance, a history of transportation requests from other users made within a threshold distance of the device-based location.

In one or more embodiments, the transportation matching system utilizes the predicted accuracy of the device-based location and the identified historical information to generate a confidence score that indicates a level of confidence for one or more potential pickup locations associated with the session indicator. For example, in at least one embodiment, the transportation matching system generates a confidence score by identifying correlations between the historical information and the predicted accuracy of the device-based location associated with the requestor computing device.

To illustrate, the transportation matching system may identify correlations such as a number of times the requestor computing device has previously been picked-up at the device-based location, a number of times other requestor computing devices have previously been picked-up at the device-based location, and a number of times the device-based location has been a destination location in other transportation requests. For each identified correlation, the transportation matching system can assign a value to the correlation, weight the value based on the strength of the correlation, and add the weighted value to the confidence score.

The transportation matching system can generate a confidence score for various potential pickup locations within a proximity (e.g., radius) of the device-based location. In response to determining the generated confidence score of a particular potential pickup location meets or exceeds a predetermined threshold, the transportation matching system identifies the particular potential pickup location as a confirmed pickup location. In some instances, the transportation matching system can determine the device-based location is the pickup location. Moreover, in one or more embodiments, the transportation matching system can identify that confidence scores associated with multiple potential locations that exceed the predetermined threshold, and thus, the transportation matching system can identify a set of pickup locations having a confidence score that indicates the confidence level of each pickup location within the set of pickup locations is sufficient to be a confirmed pickup location.

In response to identifying at least one pickup location based one or more of the above-described principles, the transportation matching system can provide one or more display components to the requestor computing device that enable quick and easy selection of the pickup location. For example, as will be illustrated in greater detail below, the transportation matching system can provide display components to one or more graphical user interfaces that enable the requestor to confirm the pickup location associated with the transportation request with a single user interaction (e.g., a single tap on a GUI button). In at least one embodiment, the display components enable the requestor to quickly and easily understand that the determined pickup location is popular, safe, and nearby. Moreover, the transportation matching system can provide computer generated instructions to the requestor device that cause the requestor device to present audible or visual directions from the requestor devices current location to the confirmed pickup location.

As such, the transportation matching system provides a computer-based solution to an existing problem in determining pickup locations associated with transportation requests. Namely, the transportation matching system determines whether a device-based location is a valid and correct pickup location with a high level of confidence, eliminating computer resource inefficiencies and transportation network lags associated with inaccurate pickup locations. Furthermore, the transportation matching system optimizes system resources by providing display components that enable a faster user selection of a known and accurate pickup location. Moreover, due to the increased accuracy of pickup locations, the transportation matching system can more efficiently match provider devices with transportation requests, reduce the number of canceled transportation requests, and more efficiently use available provider resources. Accordingly, the present transportation matching system quickly and efficiently determines accurate pickup locations for transportation requests that results in a technological improvement over conventional systems.

As used herein, a "transportation request" or "request" refers to a collection of data sent from a requestor computing device to a transportation matching system that, in turn, matches the request to at least one provider computing device (e.g., associated with a driver) that fulfills the transportation request. In one or more embodiments, a transportation request includes a pickup location, a destination location, and a transportation matching system user account identifier associated with the requestor computing device. In some embodiments, the transportation request can include GPS location associated with the requestor computing device, a pickup time (e.g., if the transportation request is scheduled for a future time), and other preferences associated with the requestor computing device (e.g., a music preferences, child seat preferences, accessibility preferences, provider rating preferences). The transportation matching system matches a received transportation request to a particular provider computing device based on the provider computing device's current proximity to the requestor computing device and/or specified pickup location, as well as on other factors such as the destination location, driver ratings, and so forth.

As used herein, a "session indicator," refers to a information received from a requestor computing device in response to various detected session events. For example, as used herein, a "session" refers to a period of activity or use in association with a transportation matching system application installed on a computing device. In one or more embodiments, the transportation matching system receives a session indicator in response to the transportation matching system application opening on the requestor computing device, in response to a detected configuration of a destination location, in response to a detected configuration of a pickup location, or in response to any other type of interaction with the transportation matching system application during a session.

In one or more embodiments, the session indicator includes information similar to a partial transportation request (e.g., a transportation request lacking a portion of data needed to fully execute a transportation request). In some embodiments, a session indicator does not include a pickup location. For example, a session indicator does include at least one of a destination location, a user identifier associated with a user of a requestor computing device, or device-based location information (e.g., GPS data), but does not include a pickup location. In any event, a session indicator includes data that allows the transportation matching system to analyze the data to identify at least one potential pickup location.

As used herein, "context information" refers to information that is associate with a transportation request or a session indicator (e.g., also referred to herein as a "partial transportation request"). Context information can include information with a request itself, information within the transport matching system, and/or information on third-party servers. Examples of context information can include a device-based accuracy level (e.g., a GPS accuracy level), user-specific historical information, location-specific historical information, information related to a user identification associated with a request, and information related to other users of the transportation matching system.

As used herein, a "pickup location" or a "confirmed pickup location" refers to a geographical location specified as an address, GPS coordinates, a landmark, a business location, or similar. In one or more embodiments, the pickup location is where a requestor engages with a provider in order for the provider to fulfill a transportation request specified by the requestor. In addition, as used herein, a "potential pickup location" refers to a geographical location that is suitable to be a pickup location for a given a transportation request, but has yet to be confirmed by either a requestor or the transportation matching system. It follows that, as used herein, a "destination location" refers to a similarly specified geographical location where the requestor disengages from the provider, and the provider indicates that the requestor's transportation request is fulfilled.

To illustrate the problems solved by the systems and methods described herein, FIG. 1 illustrates an example environment 100 for the transportation matching system 102 including the requestor computing devices 106a, 106b, and 106c, the provider computing devices 108a, 108b, and 108c. As shown, in one or more embodiments, the transportation matching system 102 can be implemented on one or more server(s) 104. As further shown in FIG. 1, the requestor computing devices 106a-106c and the provider computing devices 108a-108c communicate with the transportation matching system 102 via a network 112.

In one or more embodiments, the network 112 may include one or more networks and may use one or more communication platforms or technologies suitable for transmitting data and/or communication signals. In one or more embodiments, the network 112 includes a cellular network. Alternatively, the network 112 can include the Internet or World Wide Web. Additionally or alternatively, the network 112 can include various other types of networks that use various communication technologies and protocols, such as a corporate intranet, a virtual private network ("VPN"), a local area network ("LAN"), a wireless local network ("WLAN"), a wide area network ("WAN"), a metropolitan area network ("MAN"), or a combination of two or more such networks.

As further illustrated in FIG. 1, each of the requestor computing devices 106a-106c and the provider computing devices 108a-108c include the transportation matching system application 110a, 110b, 110c, 110d, 110e, and 110f. In one or more embodiments, the transportation matching system application 110a-110f enable the users (i.e., requestors) of the requestor computing devices 106a-106c and the users (i.e., providers) of the provider computing devices 108a-108c to interact and communicate with the transportation matching system 102. For example, requestors can configure and send transportation requests via the transportation matching system applications 110a-110c. Providers can receive match notifications and fulfill transportation requests using the transportation matching system applications 110d-110f. In at least one embodiment, the transportation matching system applications 110a-110c include features specific to requestors, while the transportation matching system applications 110d-110f include features specific to providers.

In at least one embodiment, one or more requestor computing devices 106a-106c send a transportation request to the transportation matching system 102. As discussed above, a transportation request refers to information provided by the transportation matching system applications 110a-110c and utilized by the transportation matching system 102 to match transportation requests to the provider computing devices 108a-108c. In one or more embodiments, the transportation matching system 102 receives a transportation request from the transportation matching system application 110a (e.g., a mobile application for requestors) installed on the requestor computing device 106a and utilizes the information provided in the transportation request to match the request to the provider computing device 108a. For example, the transportation matching system 102 matches the transportation request to the provider computing device 108a based on: proximity of the provider computing device 108a to a specified pickup location, provider ratings and preferences, and/or the specified destination location.

As mentioned above, in some embodiments, the transportation matching system 102 receives a partial or incomplete transportation request from the requestor computing device 106a that does not include a pickup location. In response to receiving a session indicator, the transportation matching system 102 can further receive a device-based location associated with the requestor computing device 106a. In one or more embodiments, the transportation matching system 102 then analyzes historical information associated with the session indicator and attributes of the device-based location to generate a confidence score representing a level of confidence that the device-based location is an appropriate pickup location. If the transportation matching system 102 determines confidence score for a potential pickup location exceeds a predetermined threshold, the transportation matching system 102 provides information related to the potential pickup location to a requestor computing device to define or suggest a pickup location. This process is described in greater detail below with regard to FIGS. 2 and 3.

After confirming the transportation request is complete (e.g., that the transportation request includes a confirmed pickup location), the transportation matching system 102 matches the transportation request from the requestor computing device 106a to the provider computing device 108a based on the factors discussed above. Additionally, after identifying the match, the transportation matching system 102 requests confirmation from the matched provider computing device 108a. For example, the transportation matching system 102 provides information to and receives confirmations from any of the provider computing devices 108a-108c via the transportation matching system applications 110d-110f (e.g., a mobile application for providers). In response to receiving a confirmation from the provider computing device 108a, the transportation matching system 102 provides a communication via the transportation matching system application 110a on the requestor computing device 106a stating that a provider (e.g., the provider computing device 108a) will fulfill the transportation request.

In one or more embodiments, the transportation matching system 102 can utilize third-party information to add context to the analysis of historical information associated with a device-based location. Accordingly, as shown in FIG. 1, the environment 100 also includes the third party server 114. The third party server 114 can provide calendar information for upcoming events, weather information, traffic information, and/or social media information. In at least one embodiment, the transportation matching system 102 utilizes information provided by the third party server 114, in combination with other historical information, to determine popular or common pickup locations, and other information associated with pickup locations (e.g., business names, landmark descriptions).

Figure 2:
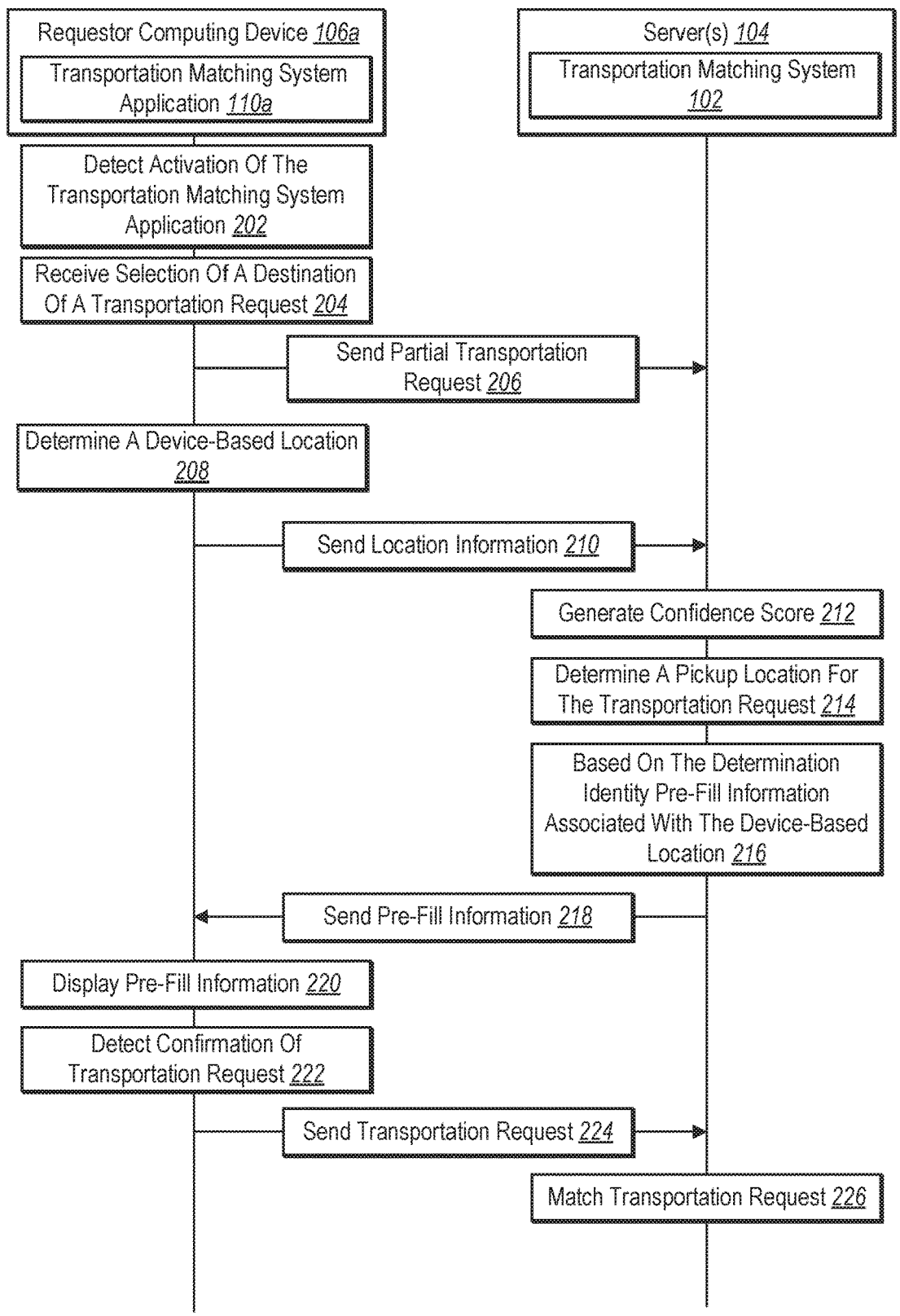
FIG. 2 illustrates a sequence diagram of a series of acts performed by the transportation matching system in determining a pickup location in accordance with one or more embodiments.

FIG. 2 illustrates an example sequence of acts in accordance with the principles described herein. For example, in accordance with the sequence of acts illustrated in FIG. 2, the requestor computing device 106a detects the activation of the transportation matching system application 110a (202). For instance, the requestor computing device 106a can detect the activation in response to: detecting a selection of a home screen icon associated with the transportation matching system application 110a or detecting a focus change in the main display of the requestor computing device 106a to the transportation matching system application 110a.

In one or more embodiments, upon activation, the transportation matching system application 110a provides a graphical user interface that enables a user to configure a destination location as part of a transportation request. Accordingly, the transportation matching system application 110a receives a selection of a destination location associated with a transportation request (204). For example, the transportation matching system application 110a can receive the selection of the destination location as a manually input address, as a user interaction with an interactive map display, or as a selection of a single destination location from a listing of destination locations. In one or more other embodiments, the receiving of the destination request may be performed after the determination of a pickup location.

The transportation matching system application 110a then sends a partial transportation request (206) (e.g., a session indicator) to the transportation matching system 102. For example, the session indicator or partial transportation request can include the selected destination location, in addition to a transportation matching system user identifier associated with the requestor computing device 106a. In one or more embodiments, the transportation matching system user identifier enables the transportation matching system 102 to access information associated with the user of the requestor computing device 106a (e.g., the requestor) such as, but not limited to, a transportation request history (e.g., requests received from the requestor computing device 106a), a transportation history (e.g., transportation requests made by the requestor computing device 106a that were successfully fulfilled), user profile information (e.g., a work address, a home address, demographic information), and additional user preferences associated with the requestor computing device 106a (e.g., child seat preferences, accessibility preferences, provider rating preferences).

Following or concurrent with sending the partial transportation request (206), the transportation matching system application 110a also determines or receives a device-based location (208) associated with the requestor computing device 106a. For example, in one embodiment, the device-based location of the requestor computing device 106a is a GPS location provided by a GPS system associated with the requestor computing device 106a. In an additional or alternative embodiment, the device-based location of the requestor computing device 106a is a location specified by the user via one or more graphical user interfaces provided by the transportation matching system application 110a. The transportation matching system application 110a then sends the device-based location information (210) to the transportation matching system 102.

In response to receiving the partial transportation request or session indicator and the device-based location information, the transportation matching system 102 generates a confidence score (212). As discussed above, the transportation matching system 102 generates a confidence score that indicates a level of confidence that the device-based location, or other potential pickup locations in proximity of the device-based location, should be associated with the session indicator as a pickup location, thereby completing the transportation request.

In one or more embodiments, the confidence score is based on an accuracy of the device-based location. For example, in one or more embodiments, the transportation matching system can analyze various factors associated with device-based location data. In one or more embodiments, the transportation matching system generates an accuracy score based on one or more device-based location data. For instance, each of the factors can be represented by a value or a weighted value to determine an overall accuracy level. Alternatively, any one of the factors, if at a predetermined value, can indicate an accuracy level. For example, if the number of GPS signals is above a predefined number, then the transportation matching system determines the device-based location is accurate. Accordingly, in some examples the accuracy score can be represented as a value (e.g., from 0-100, with 100 being the most accurate), while in other examples the accuracy score is binary (e.g., 1=accurate; 0=inaccurate).

Device-based location data can include GPS coordinates, GPS signal strength, or a number of GPS signals (e.g., number of location signals detecting the requestor device). For example, the greater the GPS signal strength and/or the larger the number of GPS signals, the more accurate the device-based location. In addition, transportation matching system can compare the GPS coordinates to geographical features corresponding to the coordinates. For instance, the transportation matching system can access a digital map that includes defined geographic features, locate the GPS coordinates on the digital map, and identify a geographic feature associated with the GPS coordinate. For instance, if the GPS coordinates correspond to inaccessible pickup location (e.g., a lake, river, large field, middle of a building, or a defined distance away from any road), then the transportation matching system reduces the accuracy score or determines that the GPS coordinates are not accurate. On the other hand, if the GPS coordinates correspond to a location within a defined proximity to a road, for example, then the transportation matching system increases the accuracy score, or determines the GPS coordinates are accurate.

In one or more embodiments, the confidence score is also based on historical information associated with the session indicator (e.g., partial transportation request) and historical information associated with the device-based location. For example, historical information associated with the transportation request can include user-specific information associated with the transportation matching system user account identifier. In one or more embodiments, user-specific information can include a transportation request history associated with the user account identifier. Furthermore, in one or more embodiments, the transportation request history includes, but is not limited to, a history of pickup locations associated the user account identifier, a history of destination locations associated the user account identifier, a history of transportation durations associated the user account identifier, a history of preferences associated the user account identifier, and a history of transportation ratings associated the user account identifier.

Additionally, historical information associated with the device-based location can include location-specific information associated with the device-based location. For example, location-specific information associated with the device-based location can include a transportation request system history of all transportation requests associated with an area within a threshold distance of the device-based location. To illustrate, the area may be a circle with the device-based location at the center and a one-hundred-yard radius. Accordingly, the transportation request system history of all transportation requests associated with that area can include a history of transportation request pickup locations within that area, a history of transportations request destination locations within that area, and other third-party information (e.g., events, traffic, crime reports) associated with that area. In one or more embodiments, the transportation matching system 102 limits the transportation request system history to a threshold amount (e.g., the last week, the last month, the last six months, the last year).

In one or more embodiments, the transportation matching system 102 generates the confidence score (212) by identifying correlations between the identified historical information and the device-based location. For example, the transportation matching system 102 can identify a correlation between the device-based location and the user-specific information that indicates the user of the requestor computing device 106a has sent in multiple previous transportation requests with the device-based location, or locations near (e.g., within a defined radius) the device-based location, specified as the pickup location. In another example, the transportation matching system 102 may identify a correlation between the device-based location and the location-specific information that indicates other users have sent transportation requests specifying the device-based location, or locations near the device-based location, as a pickup location.

In one or more embodiments, the transportation matching system 102 assigns a value to each identified correlation. For example, the transportation matching system 102 may assign a higher value to a correlation that is more indicative of a high level of confidence, such as a correlation indicating the user of the requestor computing device 106a has sent transportation requests including a potential pickup location previously. The transportation matching system 102 may assign a lower value to a correlation that is less indicative of a high level of confidence, such as a correlation indicating that other users have sent transportation requests including a pickup location within the same area as the device-based location, but not exactly at the device-based location. Accordingly, the transportation matching system can compare confidence scores of several potential locations within a defined proximity of a device-based location based on the device-based location data sent to the transportation matching system.

Furthermore, in at least one embodiment, the transportation matching system 102 weights each assigned value based on the strength of the correlation represented by that value. For example, as just mentioned, the transportation matching system 102 can assign a value to the correlation indicating the user of the requestor computing device 106a has sent transportation requests including the device-based location as the pickup location previously. The transportation matching system 102 can further weight that value based on the number of times the requestor computing device 106a has sent transportation requests including the device-based location as the pickup location. For instance, the transportation matching system 102 can add a heavier weight if the requestor computing device 106*a* has sent multiple transportation requests including the device-based location as the pickup location, and a lighter weight if the requestor computing device 106*a* has sent transportation requests including the device-based location as the pickup location only twice. In one or more embodiments, the transportation matching system 102 generates the confidence score (212) by adding the weighted values together. This process is described further below with regard to FIG. 3.

After calculating the confidence score associated with the device-based location and one or more other potential pickup locations within a predefined proximity of the device-based location, the transportation matching system 102 determines a pickup location for the partial transportation request (214) (e.g., the session indicator). For example, in at least one embodiment, the transportation matching system 102 determines that the device-based location is the pickup location in response to determining that the confidence score associated with the device-based location exceeds a predetermined threshold. Alternatively, the transportation matching system 102 can determine that a potential pickup location other than the device-based location has a confidence score above the threshold, and thus determines that the potential pickup location is the pickup location. In one or more embodiments, the transportation matching system 102 identifies multiple potential pickup locations that have confidence scores that meet or exceed a threshold, and in response, can send the requestor computing device multiple suggestions of accurate pickup locations from which the requestor can choose.

Depending on an embodiment, the predetermined threshold can be a manually input numerical value. Alternatively, it can be a value determined by a machine learning model based on the area around the device-based location. If the confidence score does not exceed the predetermined threshold, the transportation matching system 102 can request a manual selection of a pickup location via the transportation matching system application 110*a*.

Next, based on determining one or more potential pickup locations, the transportation matching system 102 identifies pre-fill information associated with the device-based location (216). For example, as mentioned above, the device-based location may be GPS coordinates. Accordingly, in order to make the transportation request graphical user interfaces provided by the transportation matching system application 110*a* more user-friendly, the transportation matching system 102 identifies pre-fill information associated with the device-based location. The pre-fill information can include, but not limited to, a business name associated with the device-based location, a landmark associated with the device-based location, a description of the device-based location, or an indicator of popularity associated with the device-based location. The transportation matching system 102 then sends the identified pre-fill information (218) to the requestor computing device 106*a*.

In one or more embodiments, the transportation matching system application 110*a* displays the pre-fill information (220) via one or more graphical user interfaces. In at least one embodiment, the transportation matching system application 110*a* detects a confirmation of the transportation request (222) including the device-based location as the pickup location via one or more of the provided graphical user interfaces. In response to detecting the confirmation (222), the transportation matching system application 110*a* sends the confirmed transportation request (224) to the transportation matching system 102. The transportation matching system 102 then proceeds to match the transportation request (226) to a provider computing device (e.g., one of the provider computing devices 108*a*-108*c*).

In other embodiments, and as mentioned above, the transportation matching system 102 can identify several potential pickup locations. Based on this identification, the transportation matching system 102 sends the requestor computing device pre-fill information that causes the one or more of the potential pickup locations to be displayed within the GUI. The potential pickup locations can include names, addresses, or other information corresponding to each potential pickup location. In some embodiments, the transportation matching system 102 automatically moves the device-based location to the nearest pickup location (e.g., snaps the location on the map within the requestor application GUI) when the nearest pickup location is within a defined near proximity (e.g., 10-20 yards). When the potential locations are outside of the defined near proximity, the transportation matching system 102 can send information to the requestor computing device that causes the requestor application to present location elements on the map that represent one or more potential pickup locations.

Figure 3:
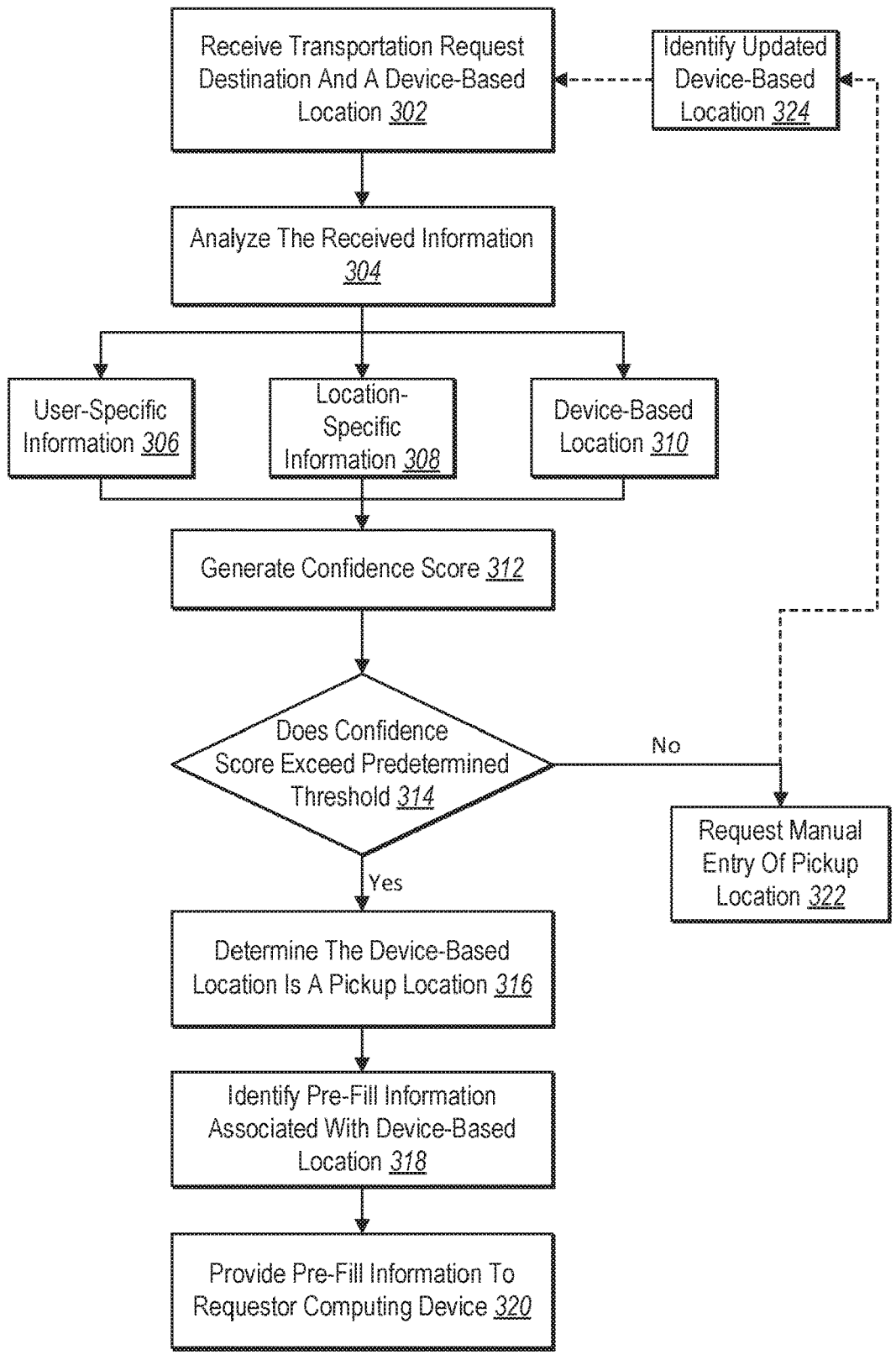
FIG. 3 illustrates a sequence diagram of a series of acts performed by the transportation matching system in generating a confidence score in accordance with one or more embodiments.

As discussed above, the transportation matching system 102 generates a confidence score that indicates a level of confidence of one or more potential pickup locations corresponding to a session indicator. FIG. 3 is a sequence diagram illustrating a series of acts undertaken by the transportation matching system 102 in generating a confidence score. For example, the series of acts begins with the transportation matching system 102 receiving a transportation request destination location and a device-based location (302) from a requestor computing device (e.g., the requestor computing device 106*a*).

For instance, in one or more embodiments, the transportation matching system 102 can receive the transportation request destination location and the device-based location as part of a session indicator. Alternatively, the transportation matching system 102 can receive the transportation request destination location along with a user identifier associated with the requestor computing device 106*a* as part of a session indicator, and can receive the device-based location as part of a system call from the requestor computing device 106*a*. The transportation matching system 102 can receive the transportation request destination location and the device-based location in sequence or in parallel, depending on system architecture.

As mentioned above, the device-based location can be one of multiple formats. For example, the device-based location can include GPS information provided by the requestor computing device 106*a* via the transportation matching system application 110*a*. For instance, the GPS information can include GPS location coordinates, as well as other GPS information such as a number of satellites currently triangulating the GPS location coordinates.

Additionally or alternatively, the device-based location can include an indication of a user-selected location. For example, in one or more embodiments, the transportation matching system application 110*a* can provide one or more graphical user interfaces including display components that enable the user to indicate a location (e.g., with a tap touch gesture, by sliding a map display). In at least one embodiment, the transportation matching system application 110*a* can provide the indication of the user-selected location to the transportation matching system 102 as a device-based location.

In response to receiving the transportation request destination location and the device-based location, the transportation matching system 102 analyzes the received information (304). As shown in FIG. 3, in one or more embodiments, the transportation matching system 102 analyzes the received information based on user-specific information (306), location-specific information (308), and the device-based location (310).

For example, in one or more embodiments, the transportation matching system 102 first utilizes the received transportation request destination location to identify user-specific information (306). As mentioned above, in at least one embodiment, the transportation matching system 102 receives the transportation request destination location as part of a transportation request including other information, such as a user identifier associated with the user of the requestor computing device 106a. The transportation matching system 102 can utilize the user identifier to identify user-specific information (306) within one or more repositories maintained by the transportation matching system 102.

For example, the user-specific information (306) can include a transportation request history associated with the user identifier. In one or more embodiments, the transportation request history includes a history of pickup locations specified in previous transportation requests, a history of destination locations specified in previous transportation requests, a history of transportation durations, and a history of transportation ratings provided by the requestor computing device 106a. In at least one embodiment, the transportation matching system 102 can analyze the history of pickup locations to identify a number of times each pickup location was included in a transportation request.

Additionally, in one or more embodiments, the transportation matching system 102 utilizes the device-based location to identify location-specific information (308). In at least one embodiment, the transportation matching system 102 first determines an accuracy of the device-based location. For example, if the device-based location is a GPS location provided by the requestor computing device 106a, it is possible that the GPS location is not accurate. In one or more embodiments, the transportation matching system 102 determines the accuracy of a GPS location based on a number of positioning satellites that are triangulated on that GPS location. For instance, the transportation matching system 102 can determine the GPS location is more accurate based on a higher number of positioning satellites currently triangulating the GPS location. Conversely, the transportation matching system 102 can determine the GPS location is less accurate based on a lower number of positioning satellites currently triangulating the GPS location. In one or more embodiments, the number of positioning satellites currently triangulating the GPS location is included in the GPS location information received from the requestor computing device 106a.

Following this, the transportation matching system identifies location-specific information (308) by identifying a transportation matching system history including previous transportation requests within a threshold distance of the device-based location. For instance, the transportation matching system 102 identifies this transportation matching system history by determining an area within the threshold distance of the device-based location (e.g., a circle with a one hundred yard radius originating at the device-based location). Next, the transportation matching system 102 identifies previous transportation requests that include one or more of a pickup location within the area, or a destination location within the area. In one or more embodiments, the transportation matching system 102 can limit the transportation matching system history to a threshold amount of time (e.g., the last week, the last month, the last six months).

The transportation matching system 102 furthers this analysis by identifying one or more correlations between the user-specific information (306), the location-specific information (308), and the device-based location (310). For example, in one or more embodiments, the transportation matching system 102 identifies a correlation between the device-based location (310) and the user-specific information (306) by identifying a previous transportation request sent by the requestor computing device 106a that includes the device-based location (310) as a pickup location. In at least one embodiment, the transportation matching system 102 identifies a separate correlation associated with each previous transportation request sent by the requestor computing device 106a that includes the device-based location (310) as a pickup location. Furthermore, the transportation matching system 102 can identify other correlations between the device-based location (310) and the user-specific information (306) including, but not limited to: previous transportation requests sent by the requestor computing device 106a that include a pickup location that is within a threshold distance from the device-based location (310) (e.g., fifty feet), and previous transportation requests sent by the requestor computing device 106a that include a destination location that either matches the device-based location (310) or is within a threshold distance of the device-based location (310). In at least one embodiment, the transportation matching system 102 can also identify correlations between user-specific information (306) identified from the third party server 114 (e.g., social media information) and the device-based location (310).

Next, the transportation matching system 102 identifies one or more correlations between the location-specific information (308) and the device-based location (310). For example, in one or more embodiments, the transportation matching system 102 identifies a correlation between the device-based location (310) and the user-specific information (308) by identifying previous transportation requests received across all or a subgroup of transportation matching system users that are associated with the device-based location (310). For instance, the transportation matching system 102 can identify a correlation between the device-based location (310) and a previous transportation request from another requestor computing device (e.g., the requestor computing device 106b) that includes the device-based location (310) as a pickup location. Similarly, the transportation matching system 102 can identify a correlation between the device-based location (310) and a previous transportation request from another requestor computing device (e.g., the requestor computing device 106c) that includes the device-based location (310) as a destination location. Additionally, in at least one embodiment, the transportation matching system 102 can also identify correlations between location-specific information (308) identified from the third party server 114 (e.g., social media information) and the device-based location (310).

After identifying one or more correlations between the analyzed information (e.g., the user-specific information (306) and the location-specific information (308)) and the device-based location (310), the transportation matching system 102 generates a confidence score (312). As discussed above, the transportation matching system 102 generates the confidence score (312) to indicate a level of confidence that the device-based location is a potential pickup location corresponding to the session indicator received from the requestor computing device 106a. For example, in one or more embodiments, the transportation matching system 102 generates the confidence score based on the identified correlations between the user-specific information (306), the location-specific information (308), and the device-based location (310), described above.

To illustrate, in at least one embodiment, the transportation matching system 102 generates the confidence score (312) by assigning a weighted value to each identified correlation, and then combining the weighted values into the confidence score. For example, for each identified correlation, the transportation matching system 102 assigns a weight to the correlation that represents how indicative the correlation is that the device-based location (310) is a potential pickup location. For instance, the transportation matching system 102 may have previously identified a correlation between the device-based location (310) and the user-specific information (306) in response to identifying a previous transportation request from the requestor computing device 106*a* including the device-based location (310) as a pickup location. In one or more embodiments, the transportation matching system 102 can assign a higher value to this correlation because it is more indicative of the device-based location (310) being a potential pickup location.

In another example, the transportation matching system 102 may have previously identified a correlation between the device-based location (310) and the location-specific information (308) in response to identifying a previous transportation request from another requestor computing device (e.g., the requestor computing device 106*b*) including a destination location within a threshold distance from the device-based location (310). In one or more embodiments, the transportation matching system 102 can assign a lower value to this correlation because it is less indicative of the device-based location (310) being a potential pickup location.

In addition to assigning a value to each identified correlation, the transportation matching system 102 also assigned a weight to each value. In one or more embodiments, the transportation matching system 102 assigns a weight to each value that represents a number of times the correlation is identified for the historical information and the device-based location (310). For example, in one embodiment, the transportation matching system 102 can identify multiple previous transportation requests from the requestor computing device 106*a* that include the device-based location (310) as a pickup location. In that embodiment, the transportation matching system 102 can identify a matching correlation associated with each of the multiple previous transportation requests. Furthermore, the transportation matching system 102 weighs the value assigned to each identified correlation based on the number of identified matching correlations.

Accordingly, if there is a high number of previous transportation requests from the requestor computing device 106*a* that include the device-based location (310) as a pickup location, the transportation matching system 102 can assign a heavier weight to the values for each identified correlation. Similarly, if there is a low number of previous transportation requests from the requestor computing device 106*a* that include the device-based location (310) as a pickup location, the transportation matching system 102 can assign a lighter weight to the values for each identified correlation. After assigning a weighted value to each identified correlation, the transportation matching system 102 generates the confidence score (312) by totaling all the weighted values.

After generating the confidence score (312), the transportation matching system 102 determines whether the confidence score meets or exceeds a predetermined threshold (314). For example, the predetermined threshold (314) may be manually provided by a system administrator. Alternatively, the predetermined threshold (314) can be a dynamic value determined by a machine learning model based on a current volume of transportation requests received by the transportation matching system 102. If the confidence score meets or exceeds the predetermined threshold ("Yes"), the transportation matching system 102 determines that the device-based location (310) is a pickup location (316) associated with the transportation request received from the requestor computing device 106*a*.

Next, in response to determining that the device-based location (310) is the pickup location (316), the transportation matching system 102 identifies pre-fill information associated with the device-based location (318). For instance, as discussed above, the transportation matching system 102 provides display controls in one or more graphical user interfaces that enable a user of the requestor computing device 106*a* to configure a pickup location with a single user interaction. Accordingly, the transportation matching system 102 identifies pre-fill information including, but not limited to, a business name, a landmark description, or a standard address (e.g., as opposed to GPS coordinates). The transportation matching system 102 can then provide the pre-fill information (320) to the requestor computing device 106*a*.

If the transportation matching system 102 determines that the generated confidence score does not meet or exceed the predetermined threshold (314) ("No"), the transportation matching system 102 can request manual entry of the pickup location (322) associated with the transportation request received from the requestor computing device 106*a*. For example, the transportation matching system 102 (e.g., via the transportation matching system application 110*a*) can provide one or more graphical user interfaces on the requestor computing device 106*a* that include display components where the user of the requestor computing device 106*a* can manually input a pickup location (e.g., by typing an address, by dropping a pin on a map).

Alternatively, the transportation matching system 102 can repeat the process illustrated in FIG. 3 in response to identifying an updated device-based location (324). For example, if the requestor computing device 106*a* is moving (e.g., the user of the requestor computing device 106*a* is walking or driving), the current device-based location may be different from the first device-based location received from the requestor computing device 106*a*. Accordingly, in response to identifying the updated device-based location (324), the transportation matching system 102 can repeat the step (302) using the updated device-based location and the original transportation request destination location. In at least one embodiment, the transportation matching system 102 may only repeat the steps illustrated in FIG. 3 a threshold number of time (e.g., three times) before requesting manual entry of the pickup location (322).

Although FIG. 3 shows the process of generating a confidence score associated with the device-based location being a potential pickup location, based on the disclosure above with respect to FIG. 2, the process of FIG. 3 can also be used (simultaneously) to determine confidence scores at one or more other potential pickup locations based on the device-based location, the user-specific information, and/or the location-specific information.

Figure 4:
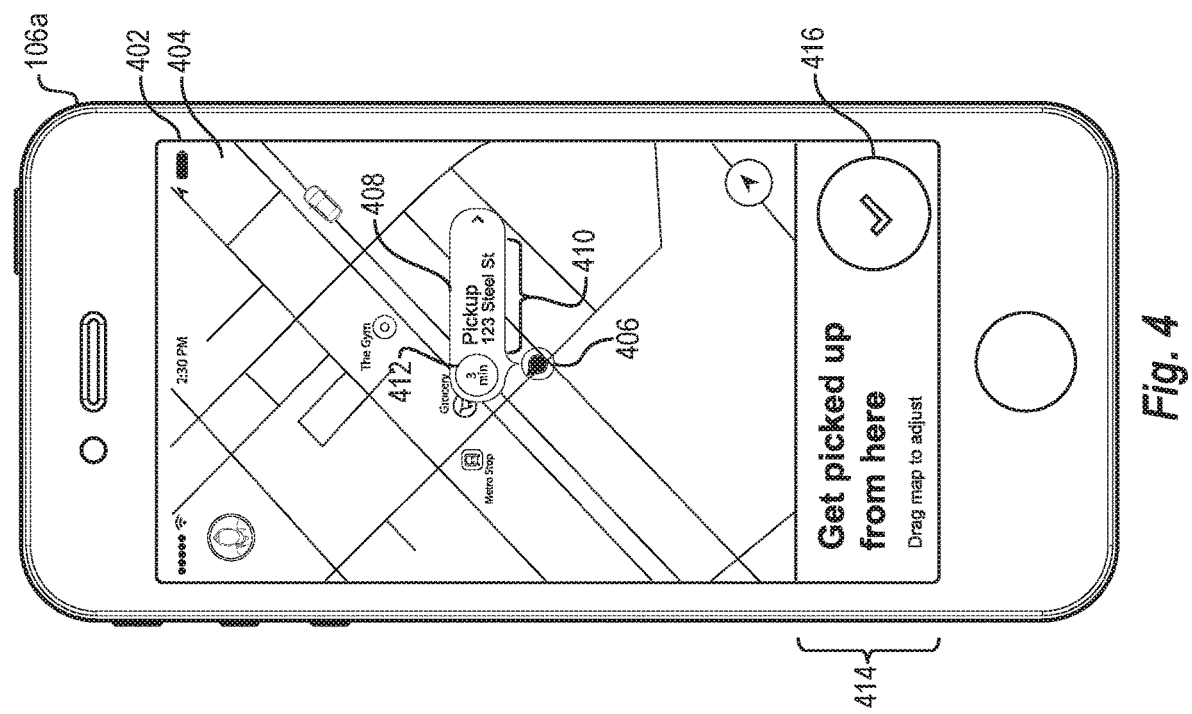
FIG. 4 illustrates a graphical user interface that the transportation matching system provides to one or more requestor computing devices in accordance with one or more embodiments.

As mentioned above, the transportation matching system 102 (e.g., via the transportation matching system application 110*a*) provides one or more graphical user interfaces including display components that enable users to specify device-based locations, configure pickup locations, and confirm pickup locations. FIGS. 4-6C illustrate a series of graphical user interfaces (GUIs) by which the transportation matching system 102 provides various display components and other features to one or more requestor computing devices. For example, as shown in FIG. 4, the transportation matching system 102 provides the pickup configuration GUI 404 on a touch screen display 402 of the requestor computing device 106a. As mentioned above, the transportation matching system 102 provides one or more GUIs, pre-fill information, and display components via the transportation matching system application 110a installed on the requestor computing device 106a.

As illustrated in FIG. 4, the pickup configuration GUI 404 includes an interactive map with a device-based location indicator 406 and a pickup location indicator 408. For example, in one or more embodiments, the transportation matching system 102 positions the device-based location indicator 406 based on GPS information received from the requestor computing device 106a. Similarly, in one or more embodiments, the transportation matching system 102 positions the pickup location indicator 408 based on a determined pickup location.

After determining the device-based location (e.g., associated with the device-based location indicator 406), the transportation matching system 102 identifies historical information associated with the device-based location and a session indicator received from the requestor computing device 106a. For example, in one or more embodiments, prior to providing the pickup configuration GUI 404, the transportation matching system 102 provides one or more GUIs that enable the user of the requestor computing device 106a to login to the transportation matching system 102 (e.g., with a transportation matching system user identifier) and to configure a destination location. Accordingly, the transportation matching system 102 can identify historical information by utilizing the user identifier to identify user-specific information (e.g., a transportation request history associated with the requestor computing device 106a). Similarly, the transportation matching system 102 can identify historical information by utilizing the device-based location to identify location-specific information (e.g., a history of previous transportation requests associated with the updated device-based location).

In response to identifying this historical information, the transportation matching system 102 generates a confidence score that the device-based location, illustrated as the device-based location indicator 406, is a potential pickup location corresponding to the session indicator received from the requestor computing device 106a. For example, as described above with reference to FIG. 3, the transportation matching system 102 identifies one or more correlations between the historical information and the device-based location, and assigns a weighted value to each identified correlation. The transportation matching system 102 then combines the weighted values to generate the confidence score.

In one or more embodiments, the transportation matching system 102 determines that the device-based location is a pickup location by determining that the generated confidence score meets or exceeds a predetermined threshold. In response to determining that the device-based location does meet or exceed the predetermined threshold, the transportation matching system 102 provides the pickup location indicator 408 associated with the device-based location indicator 406 including pre-fill information such as the pickup location description 410 and the pickup time indicator 412. In one or more embodiments, the pickup location description 410 includes a standard address, a business name, or landmark description that helps a user easily find the pickup location. Additionally, the pickup time indicator 412 informs the user of an estimated wait time for a provider to arrive at the pickup location associated with the pickup location indicator 408.

Additionally shown in FIG. 4, in response to determining that the device-based location is a pickup location (e.g., and in order to confirm the pickup location and finalize the transportation request), the transportation matching system 102 includes the pickup notification 414 and the confirmation button 416. In one or more embodiments, the transportation matching system 102 provides the pickup notification 414 and the confirmation button 416 in addition the pickup location indicator 408 in response to determining that the generated confidence score meets or exceeds the predetermined threshold. In response to a detected selection of the confirmation button 416, the transportation matching system 102 adds the device-based location associated with the device-based location indicator 406 to the transportation request as a pickup location, and proceeds to process the transportation request. Accordingly, the transportation matching system 102 provides an easy way for a user to confirm an accurate pickup location with a single user interaction.

Figure 5B:
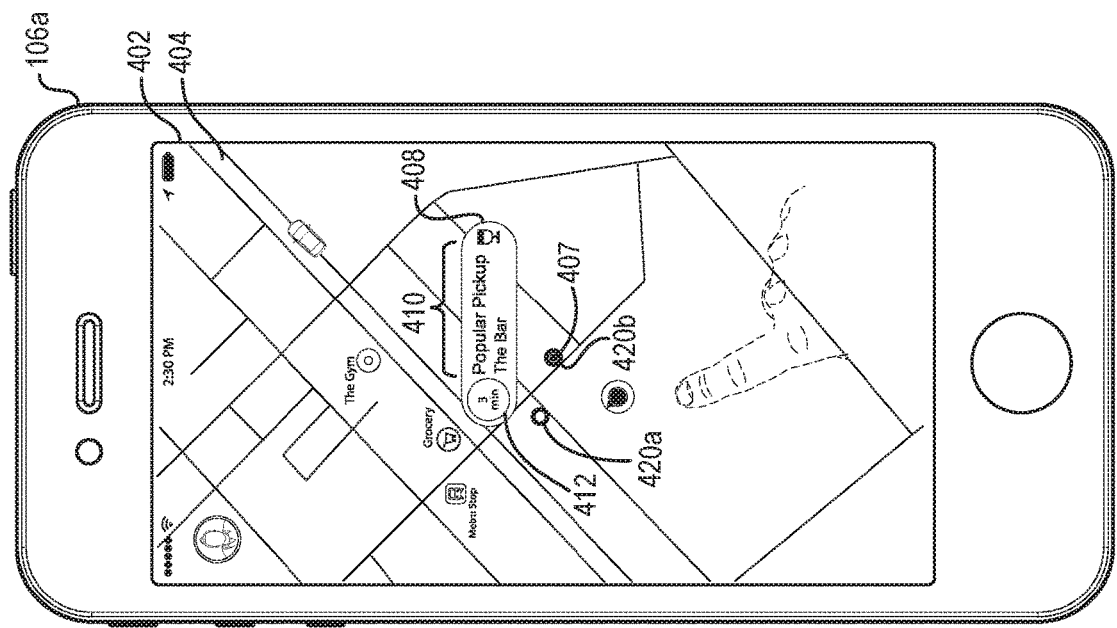
FIGS. 5A-5D illustrate a series of graphical user interfaces that the transportation matching system provides to one or more requestor computing devices in accordance with one or more embodiments.
Figure 5A:
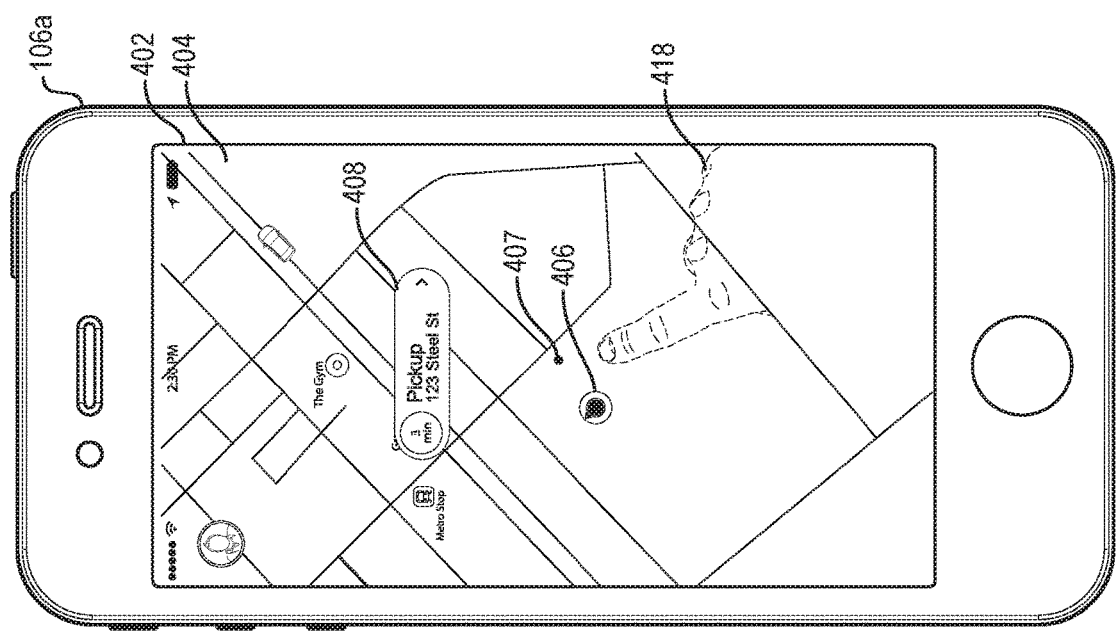

As mentioned above, in some embodiments, a device-based location can be received as an indication of a user-selected location, rather than as GPS information. FIGS. 5A-5D illustrate the process by which a user of the requestor computing device 106a indicates a device-based location. For example, as shown in FIG. 5A, the transportation matching system 102 (e.g., via the transportation matching system application 110a) can detect a slide touch gesture performed by a finger 418 (e.g., of the user of the requestor computing device 106a) with the touch screen display 402 showing the pickup configuration GUI 404. In response to detecting the slide touch gesture, the transportation matching system 102 can move the interactive map shown in the pickup configuration GUI 404 underneath the user-selected device-based location indicator 407. In at least one embodiment, as shown in FIG. 5A, the transportation matching system 102 maintains the device-based location indicator 406 (e.g., as indicated by GPS information associated with the requestor computing device 106a). Additionally, the transportation matching system 102 maintains the pickup location indicator 408 (e.g., as described with reference to FIG. 4) until a new pickup location is determined.

As the transportation matching system 102 detects the continued touch gesture performed by the finger 418, the transportation matching system 102 can identify one or more potential pickup locations within a threshold distance of the location associated with the user-selected device-based location indicator 407. For example, as shown in FIG. 5B, the during the continued detection of the slide touch gesture, the transportation matching system 102 provides one or more potential pickup location indicators 420a, 420b associated with identified potential pickup locations. In one or more embodiments, the transportation matching system 102 identifies the potential pickup locations associated with the potential pickup location indicators 420a, 420b by analyzing the user-specific information and location-specific information described above. For instance, the transportation matching system 102 can identify the potential pickup location associated with the potential pickup location indicators 420a, 420b in response to determining both locations are associated with a threshold number of previous transportation requests associated with the user of the requestor computing device 106a and other transportation matching system users. In one or more embodiments, the transportation matching system 102 can generate confidence scores for each potential pickup location, as described above. In at least one embodiment, the transportation matching system 102 can provide the potential pickup location indicators 420a, 420b in response to determining that the generated confidence scores for the associated potential pickup locations meet or exceed a predetermined threshold.

Once the continued touch gesture causes the user-selected device-based location indicator 407 to move within a threshold distance of a potential pickup location indicator (e.g., the potential pickup location indicator 420b), the transportation matching system 102 can update the pickup location indicator 408 with new pickup location information. For example, as shown in FIG. 5B, in response to the continued touch gesture causing the user-selected device-based location indicator 407 to move inside the potential pickup location indicator 420b, the transportation matching system 102 updates the pickup location indicator 408 with a new pickup location description 410 (e.g., "Popular Pick up—The Bar") and pickup time indicator 412 (e.g., 3 minutes) associated with the new pickup location. In one or more embodiments, as shown in FIG. 5B, the pickup location description 410 can include a description (e.g., "Popular Pickup"), as well as a business name (e.g., "The Bar"). In additional embodiments, the pickup location description 410 can include additional information such as a visual description (e.g., "white building with a blue door"), or directions (e.g., "first building past the intersection on the right").

In one or more embodiments, the transportation matching system 102 can request a pickup location confirmation in response to a detected release of the touch gesture. For example, as shown in FIG. 5C, in response to detecting a release of the touch gesture performed by the finger 418 (e.g., as shown in FIGS. 5A and 5B), the transportation matching system 102 can provide the pickup notification 414 including the confirmation button 416. Additionally, the transportation matching system 102 can also update the information in the pickup location indicator 408. For example, the transportation matching system 102 can update pickup location description 410 to include a standard address associated with the pickup location, thereby making the pickup location easier for the user to find.

In one or more embodiments, in response to a detected selection of the confirmation button 416, the transportation matching system 102 can provide an overview of the now-complete transportation request prior to processing the transportation request. For example, as shown in FIG. 5D, the transportation matching system 102 can provide the transportation request overview GUI 422 including the interactive map with a proposed route from the selected pickup location to the specified destination location.

Figure 5D:
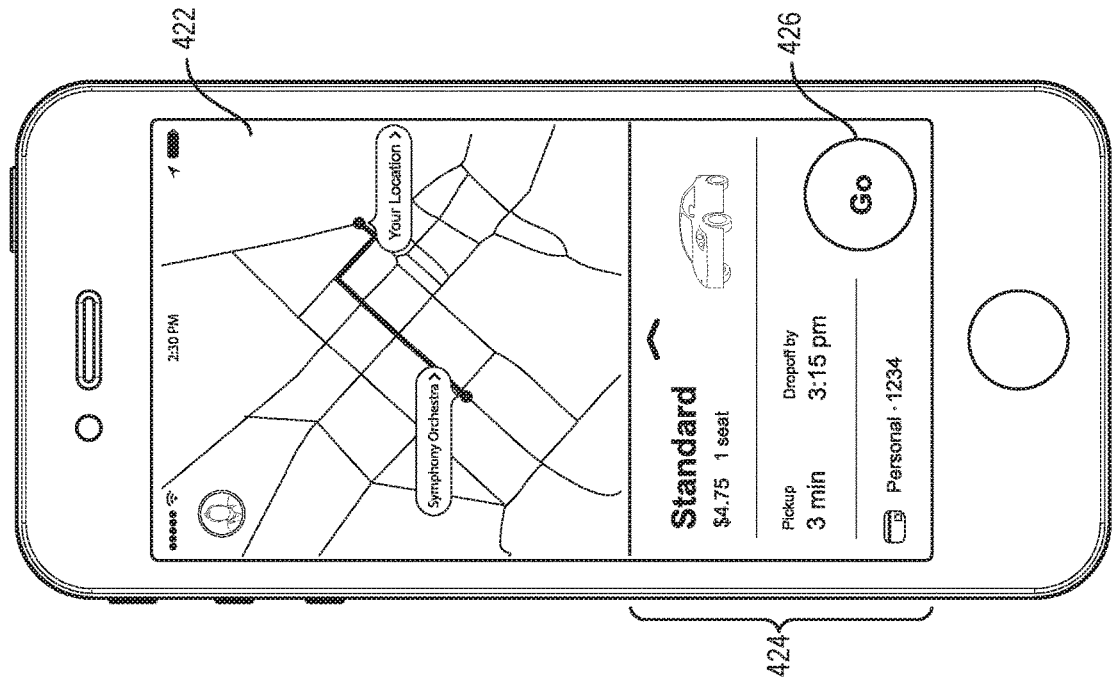
Figure 5C:
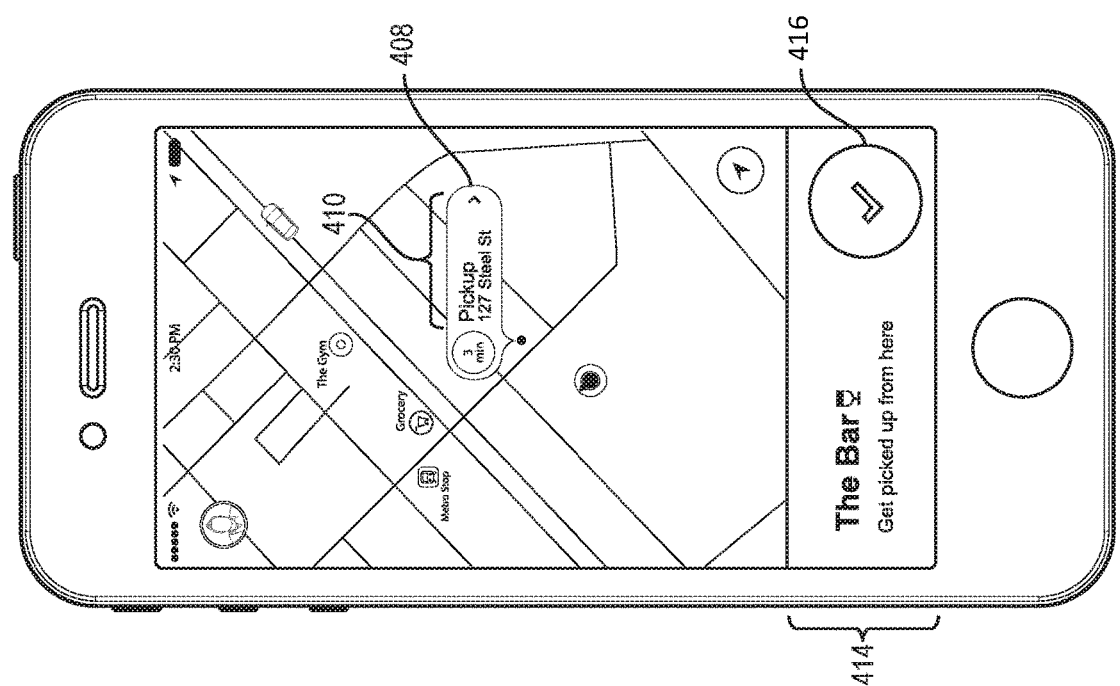

Additionally, the transportation request overview GUI 422 includes the transportation request notification 424, as shown in FIG. 5D. In one or more embodiments, the transportation request notification 424 includes additional information relevant to the transportation request such as, but not limited to, the preferred provider type, the estimated transportation cost, the amount of time until the provider arrives, the estimated time of arrival at the destination location, and the payment type. At this point, the transportation matching system 102 can enable a change to any of the preferences displayed in the transportation request notification 424. Alternatively, the transportation matching system 102 can process the transportation request represented by the transportation request overview GUI 422 in response to a detected selection of the go button 426.

In one or more embodiments, rather than enabling a touch gesture to indicate a device-based location via an interactive map, the transportation matching system 102 can enable the manual input of a device-based location with an address. For example, as shown in FIG. 6A, the transportation matching system 102 can provide a pickup location input GUI 428. In at least one embodiment, the pickup location input GUI 428 includes a text box 430, a previous pickup locations list 432, and a touch screen display keyboard 434. Utilizing the touch screen display keyboard 434, a user of the requestor computing device 106a can input an address into the text box 430. Alternatively, the user can select an entry in the previous pickup locations list 432.

Figure 6B:
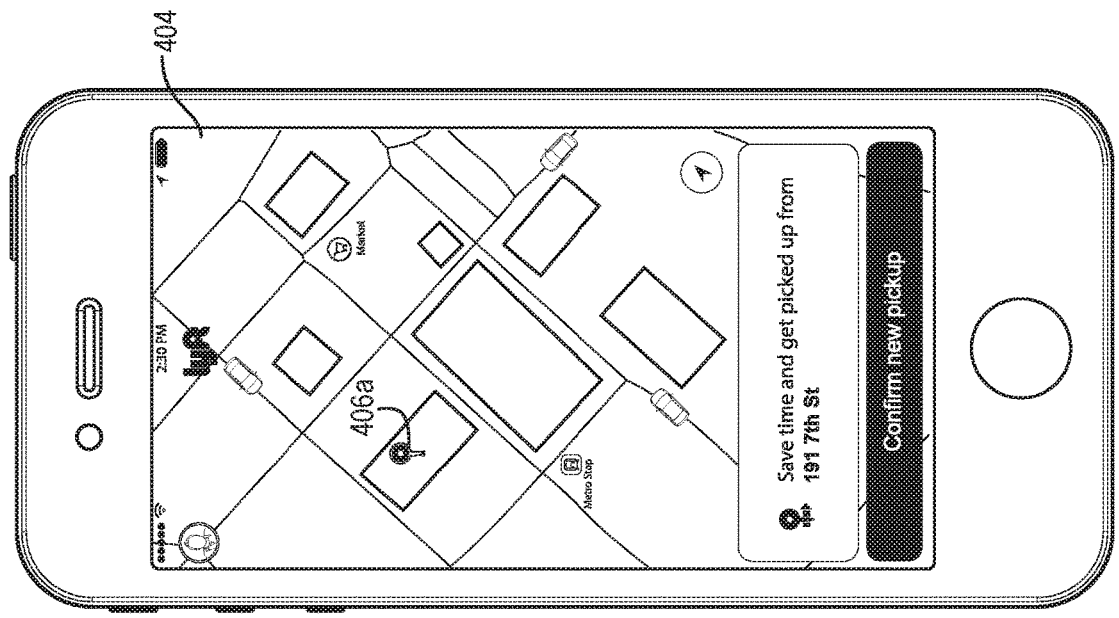
FIGS. 6A-6C illustrate a series of graphical user interface that the transportation matching system provides to one or more requestor computing devices in accordance with one or more embodiments.
Figure 6A:
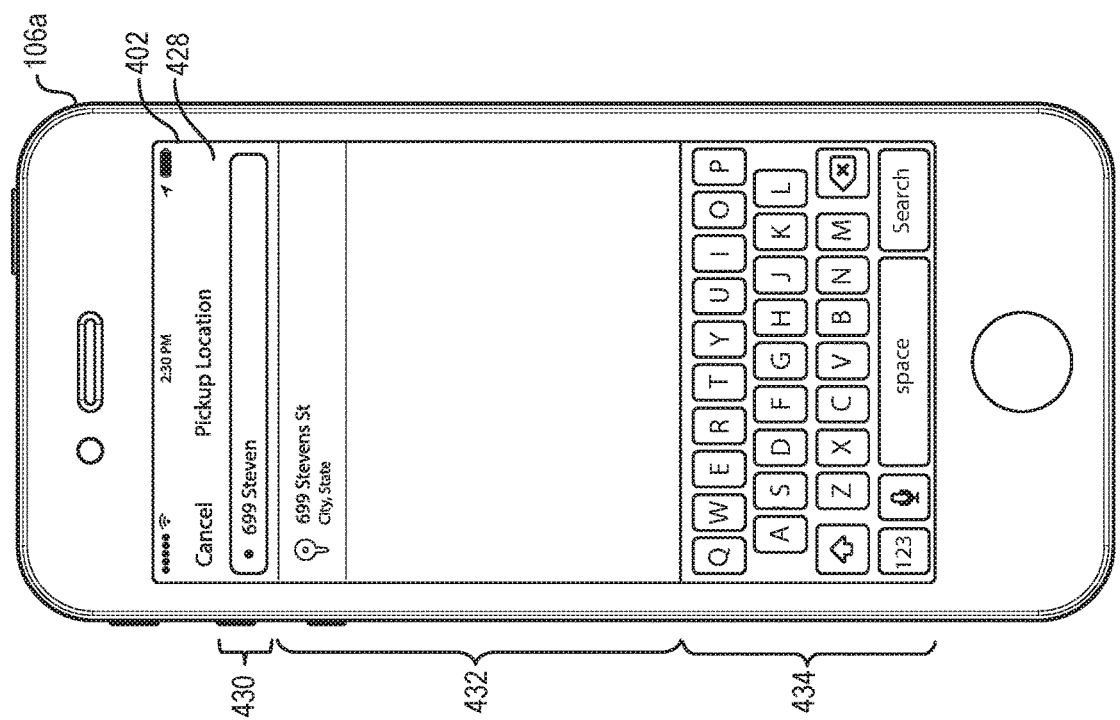

As shown in FIG. 6B, in response to receiving an input or selected address via the pickup location input GUI 428, the transportation matching system 102 provides the pickup configuration GUI 404 with the user-selected device-based location indicator 407 positioned at the input or selected address. In one or more embodiments, in response to positioning the user-selected device-based location indicator 407, the transportation matching system 102 identifies the nearest potential pickup location with a confidence score that exceeds the predetermined threshold, in the manner described above.

Figure 6C:
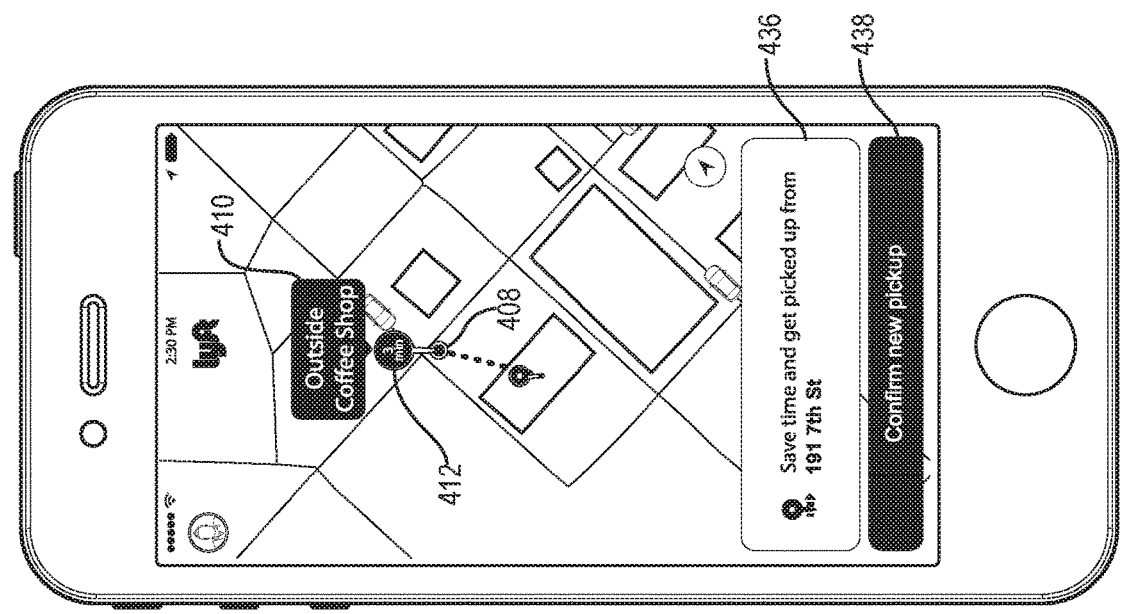

In at least one embodiment, in response to identifying the nearest potential pickup location with a confidence score that exceeds the predetermined threshold, the transportation matching system 102 can provide the pickup location indicator 408 associated with the identified potential pickup location, as shown in FIG. 6C. For example, in one or more embodiments, the transportation matching system 102 can cause the pickup configuration GUI 404 to "snap," or quickly reorient, to the pickup location indicator 408. Additionally, the transportation matching system 102 can provide the status notification 436 including information relevant to the pickup location associated with the pickup location indicator 408. In response to a detected selection of the button 438, the transportation matching system 102 can complete the transportation request with the pickup location associated with the pickup location indicator 408, and can process the transportation request.

Figure 7:
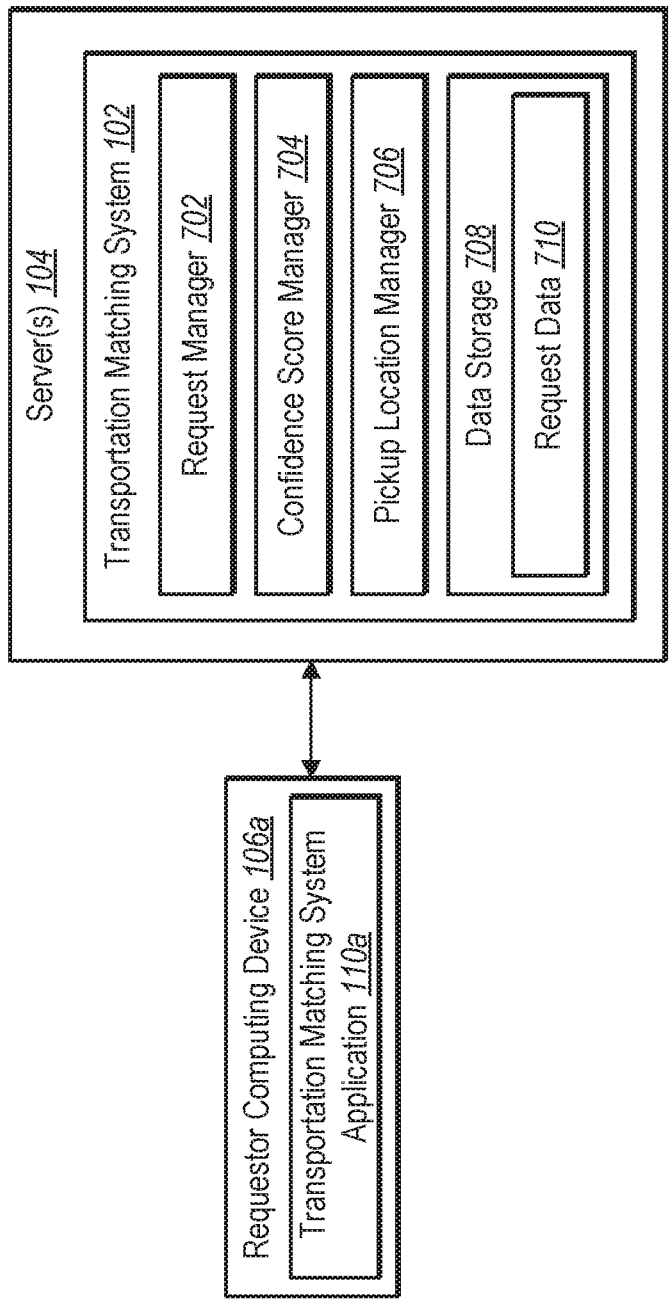
FIG. 7 illustrates a detailed schematic diagram of the transportation matching system in accordance with one or more embodiments.

FIG. 7 illustrates a schematic diagram illustrating an example embodiment of the transportation matching system 102. As shown in FIG. 7, the transportation matching system 102 includes various components for performing the processes and features described herein. For example, as shown in FIG. 7, the transportation matching system 102 includes a request manager 702, a confidence score manager 704, a pickup location manager 706, and a data storage 708 including request data 710. Also as shown in FIG. 7, the requestor computing device 106a includes the transportation matching system application 110a.

Each of the components 702-708 of the transportation matching system 102 and the transportation matching system application 110a can be implemented using a computing device including at least one processor executing instructions that cause the performance of the processes described herein. In some embodiments, the components described herein can be implemented by a single server or across multiple servers. Additionally or alternatively, a combination of one or more server devices and one or more computing devices can implement the components described herein in a different arrangement than illustrated in FIG. 7.

Additionally or alternatively, the components described herein can comprise a combination of computer-executable instructions and hardware.

In one or more embodiments, the transportation matching system application 110a is a native application installed on the requestor computing device 106a. For example, the transportation matching system application 110a can be a mobile application that installs and runs on a mobile device, such as a smart phone, tablet computer, or smart wearable. Alternatively, the transportation matching system application 110a can be a desktop application, widget, or other form of a native computer program. Furthermore, the transportation matching system application 110a may be a remote application accessed by the requestor computing device 106a. For example, the transportation matching system application 110a may be a web application that is executed within a web browser of the requestor computing device 106a.

In one or more embodiments, the transportation matching system application 110a enables a user of the requestor computing device 106a to interact with one or more features of the transportation matching system 102. For example, in order to send the transportation matching system 102 a transportation request, the transportation matching system application 110a includes features that enable the configuration of a transportation request.

Furthermore, the transportation matching system application 110a monitors other activity associated with the requestor computing device 106a. For example, the transportation matching system application 110a monitors GPS location information associated with the requestor computing device 106a. In one or more embodiments, the transportation matching system application 110a provides this additional monitored activity information to the transportation matching system 102.

Additionally, the transportation matching system application 110a generates and sends transportation requests and session indicators to the transportation matching system 102. As described above, in response to one or more detected user interactions with a graphical user interface provided via a display of the requestor computing device 106a, the transportation matching system application 110a can generate a transportation request for transport to a specified destination. Accordingly, in response to detecting one or more user interactions, the transportation matching system application 110a generates a request. In one or more embodiments, the transportation matching system application 110a generates the request as a system call with the specific request information as parameters. Alternatively, the transportation matching system application 110a can generate the transportation request, including the specific request information, as an electronic message, as metadata, or as a text file. After generating the request, the transportation matching system application 110a sends the request to the transportation matching system 102.

In one or more embodiments, the transportation matching system application 110a also receives information from the transportation matching system 102. For example, in response to sending a generated request to the transportation matching system 102, the transportation matching system application 110a on the requestor computing device 106a can receive updates on the request matching process (e.g., "We're finding you a ride"), as well as updates on the proximity of the match (e.g., "Your ride is 2 minutes away").

As shown in FIG. 7, the requestor computing device 106a is communicatively linked with the transportation matching system 102. In one or more embodiments, the transportation matching system 102 matches received transportation requests to provider computing devices. Additionally, in response to receiving a session indicator from the requestor computing device 106a the transportation matching system 102 determines whether a device-based location associated with the requestor computing device 106a is a potential pickup location based on a confidence score. In response to determining that a device-based location is a pickup location, the transportation matching system 102 identifies additional display components and information to provide to the requestor computing device 106a that enables easy selection of the determined pickup location.

As further illustrated in FIG. 7, and as mentioned above, the transportation matching system 102 includes the request manager 702. In one or more embodiments, the request manager 702 receives transportation requests and session indicators (e.g., partial transportation requests) from requestor computing devices, matches complete transportation requests to provider computing devices, and communicates match information to provider computing devices. For example, the request manager 702 receives transportation request information from the requestor computing device 106a including destination locations, device-based locations, GPS location information, and pickup locations. The request manager 702 can receive this information as part of a partial or complete transportation request, as part of a system call, or as part of another type of communication or notification.

Additionally, as mentioned above, the request manager 702 matches complete (e.g., including a pickup location, a destination location, and a user identifier) transportation request to a provider computing device. For example, in one or more embodiments, the request manager 702 matches a transportation request to a particular provider computing device based on the provider computing device's current proximity to the requestor computing device where the request originated, as well as on other factors such as the destination specified in the request, driver ratings, and so forth. In at least one embodiment, the request manager 702 provides match information to the matched provider computing device and provides transportation updates to both the requestor computing device and provider computing device included in the match.

In at least one embodiment, the request manager 702 determines that the GPS information associated with the requestor computing device 106a is not in a road-adjacent area (e.g., inside a building, more than twenty yards from a public road). For example, the request manager 702 can determine that the device-based location associated with the requestor computing device 106a is not road-adjacent. In response to this determination, the request manager 702 can update the device-based location to the nearest road-adjacent location.

As shown in FIG. 7, and as mentioned above, the transportation matching system 102 includes the confidence score manager 704. In one or more embodiments, the confidence score manager 704 identifies historical information, analyzes the historical information for correlations, generates a confidence score based on the correlations, and determines whether the generated confidence score exceeds a predetermined threshold.

For example, the confidence score manager 704 identifies historical information by utilizing the session indicator and device-based location to identify user-specific information associated with the user identifier included in the session indicator, and location-specific information based on the device-based location. In one or more embodiments, the user-specific information includes a history of transportation requests made in connection with the user identifier (e.g., pickup locations, destination locations, transportation durations). Additionally, in one or more embodiments, the location specific information includes a transportation matching system history of previous transportation requests that are associated (e.g., based on a pickup location or a destination location) with an area within a threshold distance of the device-based location. The confidence score manager 704 can limit the identified transportation matching system history to previous transportation requests made within a previous threshold of time (e.g., made within the last week, the last month).

As mentioned above, the confidence score manager 704 also analyzes the historical information for correlations. For example, the confidence score manager 704 analyzes the historical information for correlations to the device-based location. In one or more embodiments, a correlation exists between a previous transportation request (e.g., made by the user of the requestor computing device 106a or another transportation matching system user) and the device-based location when the previous transportation request includes the device-based location as a pickup location or as a destination location. Furthermore, in at least one embodiment, a correlation exists between a previous transportation request and the device-based location when the previous transportation request includes a pickup location or a destination location that is within a threshold distance (e.g., fifty yards) of the device-based location. The confidence score manager 704 can identify multiple identical correlations, meaning there are multiple previous transportation requests that include the device-based location as a pickup location, multiple previous transportation requests that include the device-based location as a destination location, and so forth. The confidence score manager 704 also tracks the number of correlations in each group of identical correlations.

As mentioned above, the confidence score manager 704 also generates a confidence score based on the correlations. In one or more embodiments, the confidence score represents a level of confidence that the device-based location is a potential pickup location that the transportation matching system 102 can include in the session indicator. For example, as discussed above with reference to FIG. 3, the confidence score manager 704 generates a confidence score by assigning a weighted value to each identified correlation.

In one or more embodiments, the confidence score manager 704 assigns a value to each identified correlation that represents how indicative or determinative the correlation is that the device-based location is a potential pickup location. The confidence score manager 704 can assign the value based on predetermined rules or heuristics, or based on one or more machine learning models. Additionally, the confidence score manager 704 assigns a weight to each value that represents the strength of the correlation, where the strength of the correlation is represented as the number of times the correlation is identified for the historical information and the device-based location. The confidence score manager 704 generates the confidence score by combining the weighted values.

Alternatively, the confidence score manager 704 can utilize a machine learning model to generate the confidence score. For example, the confidence score manager 704 can utilize a machine learning model that utilizes algorithms to learn from, and make predictions on, known data by analyzing the known data to learn to generate outputs that reflect patterns and attributes of the known data. For instance, a machine learning model can include but is not limited to, support vector machines, linear regression, logistic regression, Bayesian networks, clustering, K-nearest neighbors, K-means, random forest learning, dimensionality reduction algorithms, boosting algorithms, artificial neural networks, deep learning, etc. Thus, a machine learning model makes high-level abstractions in data by generating data-driven predictions or decisions from the known input data.

Accordingly, in one or more embodiments, the confidence score manager 704 trains a machine learning model with the identified historical information and identified correlations. Then in response to inputting the device-based location into the trained machine learning model, the confidence score manager 704 can receive a generated confidence score indicating a level of confidence that the device-based location is a pickup location. In at least one embodiment, the confidence score manager 704 periodically retrains the machine learning model with updated historical information.

Additionally, as mentioned above, the confidence score manager 704 determines whether the generated confidence score exceeds a predetermined threshold. For example, the confidence score manager 704 can utilize a predetermine threshold provided by an administrator or automatically determined by a machine learning model. If the generated confidence score does not meet or exceed the predetermined threshold, the confidence score manager 704 discards the generated confidence score and signals the transportation matching system application 110a for manual input of the pickup location. If the generated confidence score meets or exceeds the predetermined threshold, the confidence score manager 704 adds the device-based location to the session indicator, thereby completing the transportation request.

Furthermore, shown in FIG. 7 and as mentioned above, the transportation matching system 102 includes the pickup location manager 706. In one or more embodiments, the pickup location manager 706 identifies information associated with a determined pickup location and provides the identified information to the requestor computing device 106a. As discussed above, in response to determining that the device-based location is the pickup location, the transportation matching system 102 identifies and provides pre-fill information and display components to the transportation matching system application 110a that enable the user to confirm the transportation request with a single user interaction. Accordingly, in response to determining that the device-based location is the pickup location, the pickup location manager 706 identifies pre-fill information and generates display components associated with the device-based location.

For example, the pickup location manager 706 can perform lookups and data queries (e.g., in connection with the third party server 114 illustrated in FIG. 1) to identify pre-fill information associated with the device-based location. The pre-fill information can include a business name, a visual description, a standard address, and walking directions. Additionally, the pickup location manager 706 can identify pre-fill information that is specific to the transportation matching system 102. For example, if the device-based location is associated with a high number of previous transportation requests, the pickup location manager 706 can generate pre-fill information such as a description (e.g., "Popular Pickup"). In one or more embodiments, the pickup location manager 706 provides the identified information and display components to the transportation matching system application 110a on the requestor computing device 106a.

As additionally shown in FIG. 7, the transportation matching system 102 also includes the data storage 708 including the request data 710. In one or more embodiments, request data 710 includes transportation request information such as described herein.

Figure 8:
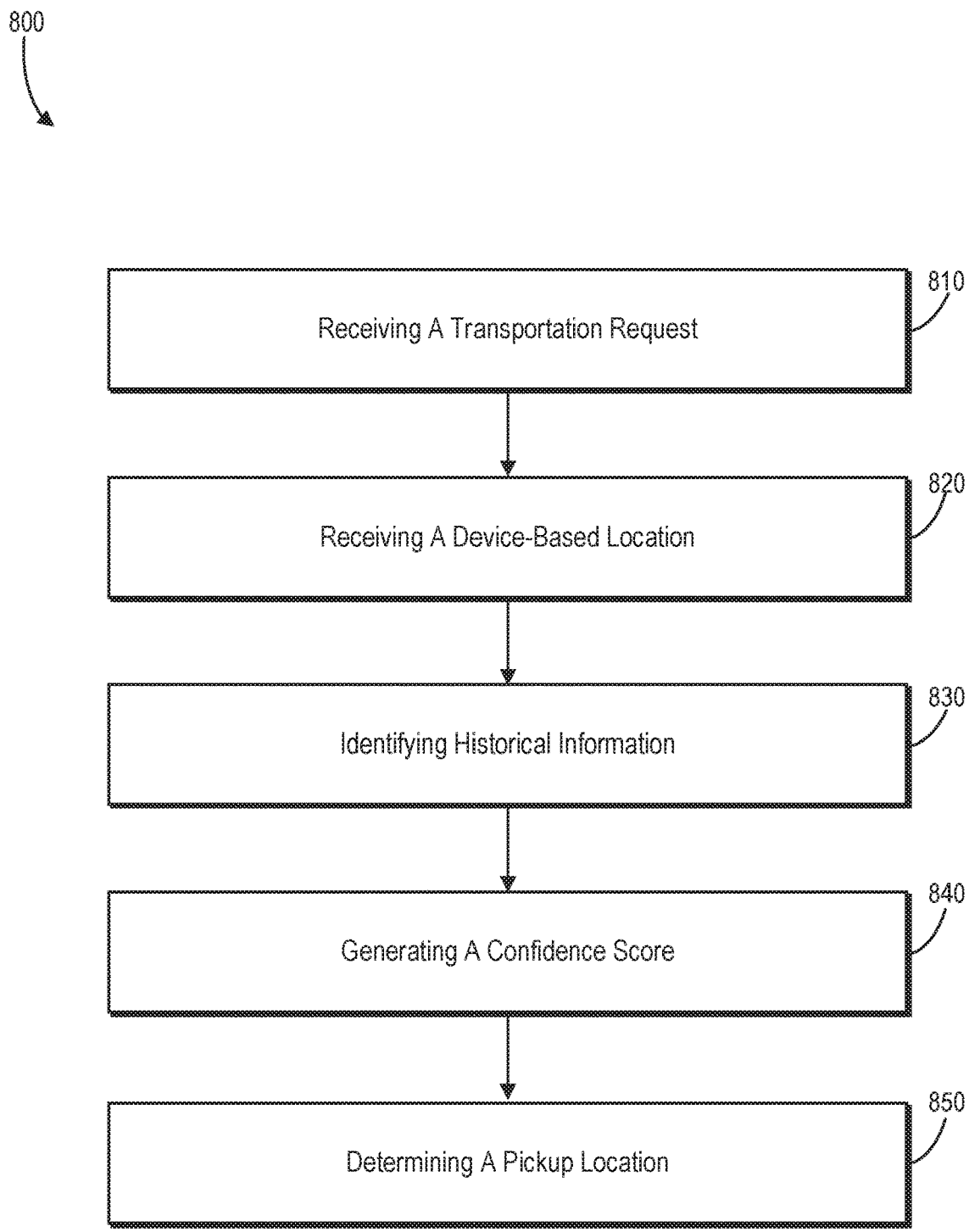
FIG. 8 illustrates a flowchart of a series of acts in a method of determining a pickup location in accordance with one or more embodiments.

Turning now to FIG. 8, this figure illustrates a flowchart of a series of acts 800 of determining a pickup location based on a confidence score. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions, that when executed by one or more processors, cause a computing device to perform the acts of FIG. 8. In still further embodiments, a system can perform the acts of FIG. 8.

As shown in FIG. 8, the series of acts 800 includes an act 810 of receiving a transportation request. For example, the act 810 can involve receiving a session indicator (e.g., a transportation request or partial transportation request) associated with a requestor computing device. In at least one embodiment, receiving the session indicator includes receiving one or more of a destination location or a transportation matching system user account identifier associated with the requestor computing device.

Also as shown in FIG. 8, the series of acts 800 includes an act 820 of receiving a device-based location. For example, the act 820 can involve receiving a device-based location associated with the requestor computing device. In one or more embodiments, receiving the device-based location corresponding with the requestor computing device includes receiving one or more of a GPS location from the requestor computing device, or receiving an indication of a user-selected location.

Furthermore, the series of acts 800 includes an act 830 of identifying historical information. For example, the act 830 can involve identifying historical information associated with the session indicator and the device-based location. In one or more embodiments, identifying historical information associated with the session indicator and the device-based location includes: identifying user-specific information associated with a user identifier; and identifying location-specific information based on the device-based location associated with the requestor computing device. For instance, identifying user-specific information associated with the user identifier can include identifying a transportation request history comprising a history of pickup locations associated the user identifier. Additionally, identifying location-specific information associated with the device-based location corresponding with the requestor computing device can include identifying a transportation matching system history comprising previous transportation requests within a threshold distance of the device-based location.

Additionally, the series of acts 800 includes an act 840 of generating a confidence score. For example, the act 840 can involve, based on the historical information associated with the session indicator and the device-based location, generating a confidence score indicating a level of confidence that the device-based location is a potential pickup location corresponding to the session indicator. For example, in one or more embodiments, the series of acts 800 includes an act of identifying one or more correlations between the identified historical information and the device-based location. Additionally, in at least one embodiment the series of acts 800 includes, for each of the identified one or more correlations: assigning a value to the correlation, determining a strength of the identified correlation, and assigning a weight to the value based on the strength of the correlation. The series of acts 800 can then include combining each of the one or more weighted values to generate the confidence score. For instance, in at least one embodiment, the value assigned to the correlation represents how indicative the correlation is that the device-based location is a potential pickup location, while the weight assigned to the value represents a number of times the correlation is identified for the historical information and the device-based location.

The series of acts 800 also includes an act 850 of determining a pickup location. For example, the act 850 can involve determining, based on the confidence score, a pickup location associated with the session indicator. In one or more embodiments, determining the pickup location associated with the session indicator includes: determining that the generated confidence score exceeds a predetermined threshold; and determining, based on the generated confidence score exceeding the predetermined threshold, that the pickup location comprises the device-based location. In at least one embodiment, the series of acts 800 includes an act of, in response to determining that the pickup location associated with the transportation request, causing the requestor computing device to update one or more display components of a transportation matching system display. For example, updating one or more display components of the transportation matching system display can include one or more of: adding an address of a pickup location to the transportation matching system display, adding a business name associated with a pickup location to the transportation matching system display, adding a landmark description associated with a pickup location to the transportation matching system display, adding a pickup time indicator to the transportation matching system display, adding a pickup notification to the transportation matching system display, or adding a confirmation button to the transportation matching system display.

Figure 9:
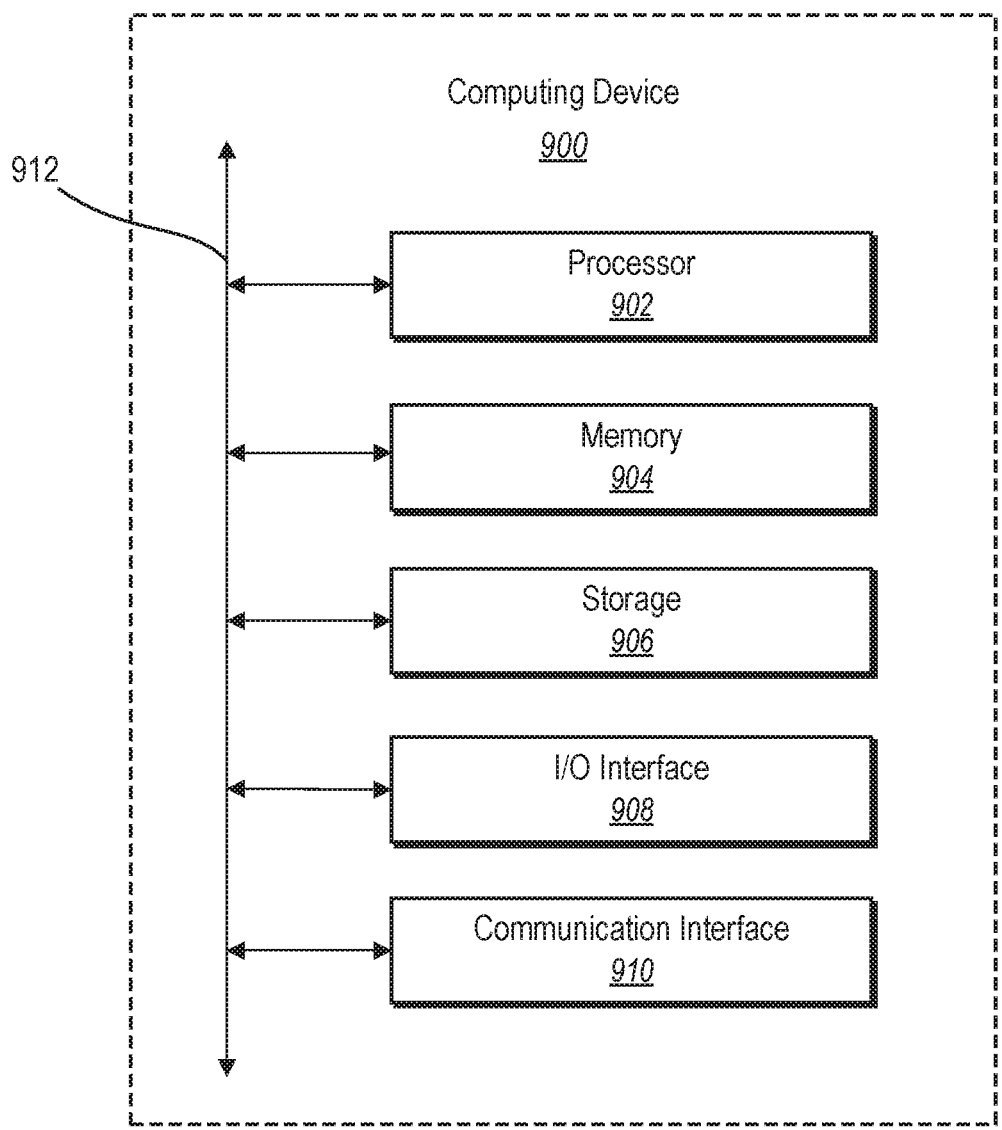
FIG. 9 illustrates a block diagram of an exemplary computing device in accordance with one or more embodiments.

FIG. 9 shows an example computing device 900, in accordance with various embodiments. In one or more embodiments, the computing device 900 may be used to implement any of the systems, devices, or methods described herein. In some embodiments, the computing system 900 may correspond to any of the various devices described herein, including, but not limited to, mobile devices, tablet computing devices, wearable devices, personal or laptop computers, vehicle-based computing devices, or other devices or systems described herein. As shown in FIG. 9, the computing device 900 can include various subsystems connected by a bus 902. The subsystems may include an I/O device subsystem 904, a display device subsystem 906, and a storage subsystem 910 including one or more computer readable storage media 908. The subsystems may also include a memory subsystem 912, a communication subsystem 920, and a processing subsystem 922.

In the computing system 900, the bus 902 facilitates communication between the various subsystems. Although a single bus 902 is shown, alternative bus configurations may also be used. The bus 902 may include any bus or other component to facilitate such communication as is known to one of ordinary skill in the art. Examples of such bus systems may include a local bus, parallel bus, serial bus, bus network, and/or multiple bus systems coordinated by a bus controller. The bus 902 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, the I/O device subsystem 904 may include various input and/or output devices or interfaces for communication with such devices. Such devices may include, without limitation, a touch screen display or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. The I/O device subsystem 904 may also include identification or authentication devices, such as fingerprint scanners, voiceprint scanners, iris scanners, or other biometric sensors or detectors. In various embodiments, the I/O device subsystem 904 may include audio output devices, such as speakers, media players, or other output devices.

The computing device 900 may include a display device subsystem 906. The display device subsystem 906 may include one or more lights, such as one or more light emitting diodes (LEDs), LED arrays, a liquid crystal display (LCD) or plasma display or other flat-screen display, a touch screen, a head-mounted display or other wearable display device, a projections device, a cathode ray tube (CRT), and any other display technology configured to visually convey information. In various embodiments, the display device subsystem 906 may include a controller and/or interface for controlling and/or communicating with an external display, such as any of the above-mentioned display technologies.

As shown in FIG. 9, the computing device 900 may include the storage subsystem 910 including various computer readable storage media 908, such as hard disk drives, solid state drives (including RAM-based and/or flash-based SSDs), or other storage devices. In one or more embodiments, the computer readable storage media 908 is configurable to store software, including programs, code, or other instructions, that is executable by a processor to provide functionality described herein. In some embodiments, the storage subsystem 910 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, the storage subsystem 910 can include a media reader, card reader, or other storage interface to communicate with one or more external and/or removable storage devices. In various embodiments, the computer readable storage media 908 can include any appropriate storage medium or combination of storage media. For example, the computer readable storage media 908 can include, but is not limited to, any one or more of random access memory (RAM), read only memory (ROM), electronically erasable programmable ROM (EEPROM), flash memory or other memory technology, optical storage (e.g., CD-ROM, DVD, Blu-Ray® disk or other optical storage device), magnetic storage (e.g., tape drives, cassettes, magnetic disk storage or other magnetic storage devices). In some embodiments, the computer readable storage media 908 can include data signals or any other medium through which data can be sent and/or received.

The memory subsystem 912 can include various types of memory, including RAM, ROM, flash memory, or other memory. The memory subsystem 912 can include SRAM (static RAM) or DRAM (dynamic RAM). In some embodiments, the memory subsystem 912 can include a BIOS (basic input/output system) or other firmware configured to manage initialization of various components during for example startup. As shown in FIG. 9, the memory subsystem 912 can include applications 914 and application data 916. The applications 914 may include programs, code, or other instructions, that can be executed by a processor. The applications 914 can include various applications such as browser clients, location management applications, ride management applications, data management application, and any other application. The application data 916 can include any data produced and/or consumed by the applications 914. The memory subsystem 912 can additionally include operating system, such as macOS®, Windows®, Linux®, various UNIX® or UNIX- or Linux-based operating systems or other operating systems.

The computing device 900 can also include a communication subsystem configured to facilitate communication between the computing device 900 and various external computer systems and/or networks (such as the Internet, a LAN, a WAN, a mobile network, or any other network). The communication subsystem can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally or alternatively, the communication subsystem can include hardware and/or software components to communicate with satellite-based or ground-based location services, such as GPS (global positioning system). In some embodiments, the communication subsystem may include, or interface with, various hardware or software sensors. The sensors may be configured to provide continuous and/or periodic data or data streams to a computer system through the communication subsystem.

Figure 10:
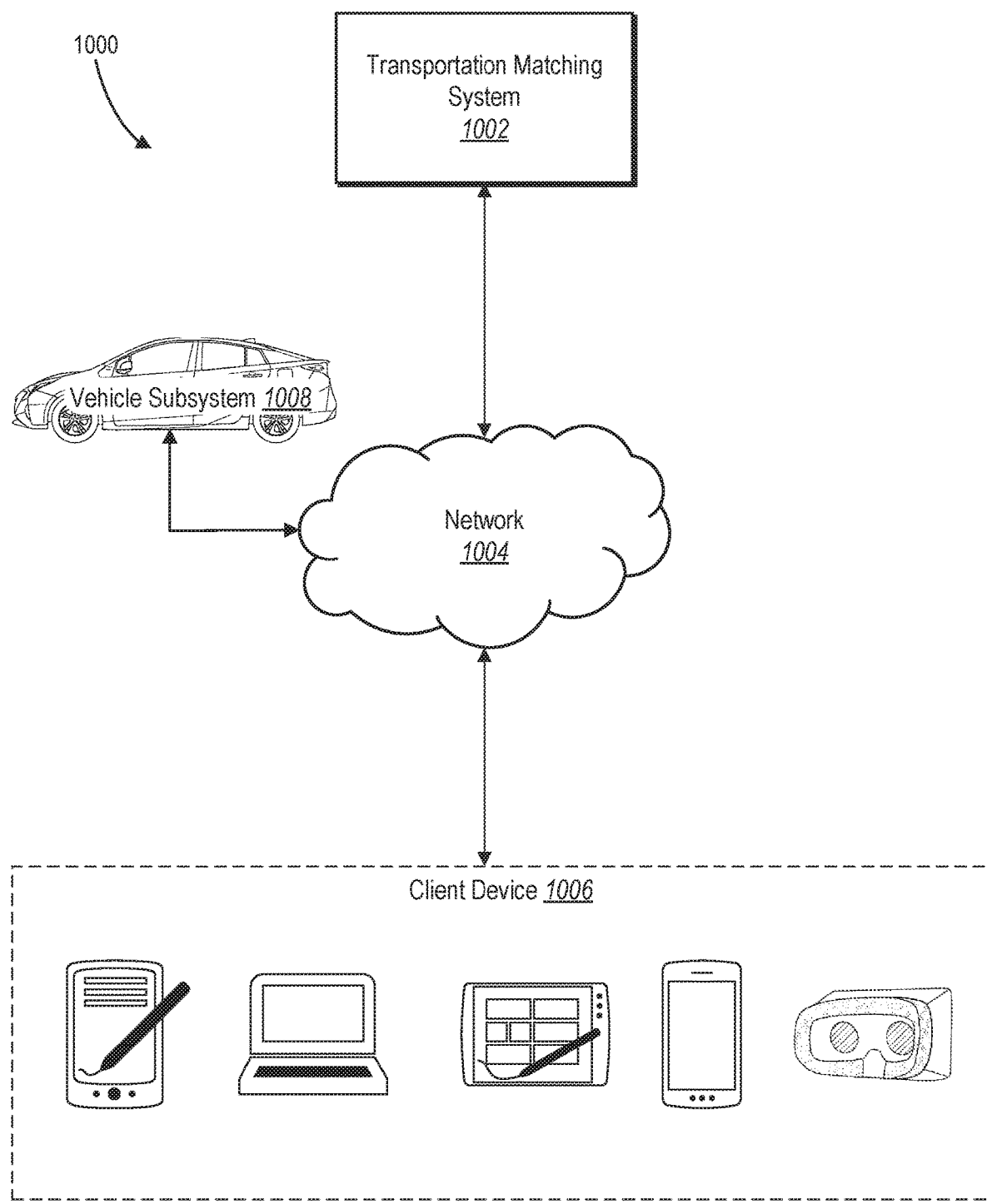
FIG. 10 illustrates an example network environment of a transportation matching system in accordance with one or more embodiments.

As shown in FIG. 9, the processing subsystem can include one or more processors or other devices operable to control the computing device 900. Such processors can include the single core processors, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing subsystem may be used independently or in combination depending on the application FIG. 10 illustrates an example network environment 1000 of a transportation matching system (e.g., the transportation matching system 102). The network environment 1000 includes a client device 1006, a transportation matching system 1002, and a vehicle subsystem 1008 connected to each other by a network 1004. Although FIG. 10 illustrates a particular arrangement of the client device 1006, the transportation matching system 1002, the vehicle subsystem 1008, and the network 1004, this disclosure contemplates any suitable arrangement of the client device 1006, the transportation matching system 1002, the vehicle subsystem 1008, and the network 1004. As an example, and not by way of limitation, two or more of the client device 1006, the transportation matching system 1002, and the vehicle subsystem 1008 communicate directly, bypassing the network 1004. As another example, two or more of the client device 1006, the transportation matching system 1002, and the vehicle subsystem 1008 may be physically or logically co-located with each other in whole or in part. Moreover, although FIG. 10 illustrates a particular number of the client devices 1006, the transportation matching systems 1002, the vehicle subsystems 1008, and the networks 1004, this disclosure contemplates any suitable number of the client devices 1006, the transportation matching systems 1002, the vehicle subsystems 1008, and the networks 1004. As an example, and not by way of limitation, the network environment 1000 may include multiple client devices 1006, the transportation matching systems 1002, the vehicle subsystems 1008, and the networks 1004.

This disclosure contemplates any suitable network 1004. As an example, and not by way of limitation, one or more portions of the network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1004 may include one or more networks 1004.

Links may connect the client device 1006, the transportation matching system 1002, and the vehicle subsystem 1008 to the communication network 1004 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by the client device 1006. As an example, and not by way of limitation, a client device 1006 may include any of the computing devices discussed above in relation to FIG. 8. A client device 1006 may enable a network user at the client device 1006 to access a network. A client device 1006 may enable its user to communicate with other users at other client systems 1006.

In particular embodiments, the client device 1006 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1006 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1006 one or more Hyper Text Markup Language (HTML) files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 1002 may be a network-addressable computing system that can host a ride share transportation network. The transportation matching system 1002 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 1002. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation matching system 1002 may manage ride matching services to connect a user/requester with a vehicle and/or provider. By managing the ride matching services, the transportation matching system 1002 can manage the distribution and allocation of vehicle subsystem resources and user resources such as GPS location and availability indicators, as described herein.

The transportation matching system 1002 may be accessed by the other components of the network environment 1000 either directly or via network 1004. In particular embodiments, the transportation matching system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or a transportation matching system 1002 to manage, retrieve, modify, add, or delete, the information stored in data store.

In particular embodiments, the transportation matching system 1002 may provide users with the ability to take actions on various types of items or objects, supported by the transportation matching system 1002. As an example, and not by way of limitation, the items and objects may include ride share networks to which users of the transportation matching system 1002 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 1002 or by an external system of a third-party system, which is separate from the transportation matching system 1002 and coupled to the transportation matching system 1002 via a network 1004.

In particular embodiments, the transportation matching system 1002 may be capable of linking a variety of entities. As an example, and not by way of limitation, the transportation matching system 1002 may enable users to interact with each other or other entities, or to allow users to interact with these entities through an application programming interfaces (API) or other communication channels.

In particular embodiments, the transportation matching system 1002 may include a variety of servers, sub-systems, programs, modules, logs, and data stores. In particular embodiments, the transportation matching system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 1002 may also include suitable components such as network interfaces, security mechanisms, load balancers, failover servers, management-and-network-operations consoles, other suitable components, or any suitable combination thereof. In particular embodiments, the transportation matching system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 1002 and one or more client systems 1006. An action logger may be used to receive communications from a web server about a user's actions on or off the transportation matching system 1002. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from the client device 1006 responsive to a request received from the client device 1006. Authorization servers may be used to enforce one or more privacy settings of the users of the transportation matching system 1002. A privacy setting of a user determines how particular information associated with a user can be shared. The authorization server may allow users to opt in to or opt out of having their actions logged by the transportation matching system 1002 or shared with other systems, such as, for example, by setting appropriate privacy settings. Third-party-content-object stores may be used to store content objects received from third parties. Location stores may be used for storing location information received from the client systems 1006 associated with users.

In addition, the vehicle subsystem 1008 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1008 can include an autonomous vehicle—i.e., a vehicle that does not require a human operator. In these embodiments, the vehicle subsystem 1008 can perform maneuvers, communicate, and otherwise function without the aid of a human provider, in accordance with available technology.

In particular embodiments, the vehicle subsystem 1008 may include one or more sensors incorporated therein or associated thereto. For example, sensor(s) can be mounted on the top of the vehicle subsystem 1008 or else can be located within the interior of the vehicle subsystem 1008. In certain embodiments, the sensor(s) can be located in multiple areas at once—i.e., split up throughout the vehicle subsystem 1008 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 1008 may include a communication device capable of communicating with the client device 1006 and/or the transportation matching system 1002. For example, the vehicle subsystem 1008 can include an on-board computing device communicatively linked to the network 1004 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:
   displaying, by a requester device, a graphical user interface for selecting a pickup location for a transportation request, the graphical user interface comprising an interactive map and a user-selected location indicator pin corresponding to a location within the interactive map;
   modifying the location of the user-selected location indicator pin within the interactive map based on detecting a touch gesture directed to the graphical user interface;
   based on receiving the touch gesture and modifying the location of the user-selected location indicator within the interactive map, providing, for simultaneous display with the user-selected location indicator pin within the interactive map, a potential pickup location indicator positioned at a potential pickup location within the interactive map that is different than the modified location of the user-selected location indicator pin, and where the potential pickup location is based on at least one prior pickup location corresponding to at least one prior transportation request;
   determining a confidence score indicating a level of confidence that the modified location of the user-selected location indicator pin corresponds to the potential pickup location; and
   in response to detecting a release of the touch gesture and based on the confidence score, snapping the user-selected location indicator pin to the potential pickup location by automatically moving the interactive map to align the user-selected location indicator pin with the potential pickup location indicator.

2. The method of claim 1, further comprising determining the at least one prior pickup location based on at least one of user-specific pickup history information or location-specific pickup history information.

3. The method of claim 1, further comprising, while receiving the touch gesture and while modifying the location of the user-selected location indicator pin within the interactive map:
   determining, for the potential pickup location, a distance relative to the location indicated by the user-selected location indicator pin; and
   providing, for display within the graphical user interface and based on the determined distance, a pickup location description element that includes information associated with the potential pickup location indicator.

4. The method of claim 1, wherein determining the confidence score comprises assigning a weight to the potential pickup location based on a number of previous transportation requests with pickup locations at the potential pickup location.

5. The method of claim 1, further comprising, in response to the release of the touch gesture:
   displaying, within the graphical user interface, a pickup location description element that includes descriptive information associated with the potential pickup location.

6. The method of claim 1, wherein modifying the location of the user-selected location indicator pin within the interactive map comprises sliding the interactive map underneath the user-selected location indicator pin while maintaining a position of the user-selected location indicator pin.

7. The method of claim 1, wherein:
   determining the confidence score is based on at least one of a pickup history of a user associated with the requester device or a pickup history associated with the potential pickup location.

8. A non-transitory computer readable medium comprising instructions that, when executed by at least one processor, cause a computer device to:
   display, by a requester device, a graphical user interface for selecting a pickup location for a transportation request, the graphical user interface comprising an interactive map and a user-selected location indicator pin indicating a location within the interactive map;
   modify the location of the user-selected location indicator pin within the interactive map based on detecting a touch gesture directed to the graphical user interface;
   based on receiving the touch gesture and modifying the location of the user-selected location indicator pin within the interactive map, provide, for simultaneous display with the user-selected location indicator pin within the interactive map, a potential pickup location indicator positioned at a potential pickup location within the interactive map that is different than the modified location of the user-selected location indicator pin, and where the potential pickup location is based on at least one prior pickup location corresponding to at least one prior transportation request;
   determine a confidence score indicating a level of confidence that the modified location of the user-selected location indicator pin corresponds to the potential pickup location; and
   in response to detecting a release of the touch gesture and based on the confidence score, snap the user-selected location indicator pin to the potential pickup location by automatically moving the interactive map to align the user-selected location indicator pin with the potential pickup location indicator.

9. The non-transitory computer readable medium of claim 8, further comprising instructions that, when executed by the at least one processor, cause the computer device to determine the at least one prior pickup location based on at least one of user-specific pickup history information or location-specific pickup history information.

10. The non-transitory computer readable medium of claim 8, further comprising instructions that, when executed by the at least one processor, cause the computer device to, while receiving the touch gesture and while modifying the location of the user-selected location indicator pin within the interactive map:
  determine, for the potential pickup location, a distance relative to the location indicated by the user-selected location indicator pin; and
  providing, for display within the graphical user interface and based on the determined distance, a pickup location description element that includes information associated with a closest potential pickup location associated with the potential pickup location indicator.

11. The non-transitory computer readable medium of claim 10, further comprising instructions that, when executed by the at least one processor, cause the computer device to determine the confidence score by assigning a weight to the potential pickup location based on a number of previous transportation requests with pickup locations at the potential pickup location.

12. The non-transitory computer readable medium of claim 8, further comprising instructions that, when executed by the at least one processor, cause the computer device to, in response to the release of the touch gesture:
  display, within the graphical user interface, a pickup location description element that includes descriptive information associated with the potential pickup location.

13. The non-transitory computer readable medium of claim 8, wherein the instructions cause the computer device to modify the location of the user-selected location indicator pin within the interactive map by sliding the interactive map underneath the user-selected location indicator pin while maintaining a position of the user-selected location indicator pin.

14. A system comprising:
  at least one processor; and
  a non-transitory computer readable medium comprising instructions that, when executed by the at least one processor, cause the system to:
    display, by a requester device, a graphical user interface for selecting a pickup location for a transportation request, the graphical user interface comprising an interactive map and a user-selected location indicator pin indicating a location within the interactive map;
    modify the location of the user-selected location indicator pin within the interactive map based on detecting a touch gesture directed to the graphical user interface;
    based on receiving the touch gesture and modifying the location of the user-selected location indicator pin within the interactive map, provide, for simultaneous display with the user-selected location indicator pin within the interactive map, a potential pickup location indicator positioned at a potential pickup location within the interactive map that is different than the modified location of the user-selected location indicator pin, and where the potential pickup location is based on at least one prior pickup location corresponding to at least one prior transportation request;
    determine a confidence score indicating a level of confidence that the modified location of the user-selected location indicator pin corresponds to the potential pickup location; and
    in response to detecting a release of the touch gesture and based on the confidence score, snap the user-selected location indicator pin to the potential pickup location by automatically moving the interactive map to align the user-selected location indicator pin with the potential pickup location indicator.

15. The system of claim 14, further comprising instructions that, when executed by the at least one processor, cause the system to determine the at least one prior pickup location based on at least one of user-specific pickup history information or location-specific pickup history information.

16. The system of claim 14, further comprising instructions that, when executed by the at least one processor, cause the system to, while receiving the touch gesture and while modifying the location of the user-selected location indicator pin within the interactive map:
  determine, for the potential pickup location, a distance relative to the location indicated by the user-selected location indicator pin; and
  providing, for display within the graphical user interface and based on the determined distance, a pickup location description element that includes information associated with a closest potential pickup location associated with the potential pickup location indicator.

17. The system of claim 16, further comprising instructions that, when executed by the at least one processor, cause the system to determine the confidence score by assigning a weight to the potential pickup location based on a number of previous transportation requests with pickup locations at the potential pickup location.

18. The system of claim 14, further comprising instructions that, when executed by the at least one processor, cause the system to, in response to the release of the touch gesture:
  display, within the graphical user interface, a pickup location description element that includes descriptive information associated with the potential pickup location.

19. The system of claim 14, wherein the instructions cause the system to modify the location of the user-selected location indicator pin within the interactive map by sliding the interactive map underneath the user-selected location indicator pin while maintaining a position of the user-selected location indicator pin.

20. The system of claim 14, further comprising instructions that, when executed by the at least one processor, cause the system to:
  determine the confidence score based on at least one of a pickup history of a user associated with the requester device or a pickup history associated with the potential pickup location.

\* \* \* \* \*